US012729725B2

(12) United States Patent
Yoder et al.

(10) Patent No.: US 12,729,725 B2
(45) Date of Patent: Sep. 8, 2026

(54) INTEGRATED WHEEL END SYSTEM

(71) Applicant: Warn Automotive, LLC, Milwaukie, OR (US)

(72) Inventors: Bryan Yoder, Corvallis, OR (US); Russell James Conine, Portland, OR (US); Bryce Gould, Vancouver, WA (US); Joshua Taylor Roat, Portland, OR (US)

(73) Assignee: Warn Automotive, LLC, Milwaukie, OR (US)

( * ) Notice: Subject to any disclaimer, the term of this patent is extended or adjusted under 35 U.S.C. 154(b) by 81 days.

(21) Appl. No.: 18/980,261

(22) Filed: Dec. 13, 2024

(65) Prior Publication Data

US 2025/0196630 A1 Jun. 19, 2025

Related U.S. Application Data

(60) Provisional application No. 63/611,385, filed on Dec. 18, 2023.

(51) Int. Cl.

*F16H 63/32* (2006.01)
*F16D 23/12* (2006.01)
*F16D 23/14* (2006.01)
*F16D 27/118* (2006.01)
*B60K 17/35* (2006.01)
*F16H 61/02* (2006.01)

(52) U.S. Cl.

CPC .......... *F16D 27/118* (2013.01); *F16H 63/32* (2013.01); *B60K 17/3515* (2013.01); *F16D 2023/126* (2013.01); *F16D 23/14* (2013.01); *F16D 2023/141* (2013.01); *F16H 61/0204* (2013.01)

(58) Field of Classification Search

CPC ................ B60K 17/3515; F16D 23/14; F16D 2023/126; F16D 2023/141; F16D 27/118; F16H 63/32; F16H 63/34; F16H 59/02; F16H 61/0204

See application file for complete search history.

(56) References Cited

U.S. PATENT DOCUMENTS

| | | | |
|---|---|---|---|
| 7,143,883 B2 | 12/2006 | McCalla et al. | |
| 9,205,738 B2 | 12/2015 | Clohessy et al. | |
| 11,168,743 B2 | 11/2021 | Smith et al. | |
| 11,697,344 B2 | 7/2023 | Bird et al. | |
| 2015/0059508 A1* | 3/2015 | Ekonen | F16H 63/08 74/473.1 |
| 2020/0096054 A1* | 3/2020 | Smith | B60K 17/34 |
| 2022/0340004 A1* | 10/2022 | Bird | B60K 17/356 |

(Continued)

FOREIGN PATENT DOCUMENTS

| | | |
|---|---|---|
| CN | 201875013 U | 6/2011 |
| EP | 4249775 A1 | 9/2023 |

*Primary Examiner* — Tinh T Dang
(74) *Attorney, Agent, or Firm* — Fish & Richardson P.C.

(57) ABSTRACT

An actuator for a wheel end disconnect system includes a housing and a solenoid mounted to the housing, the solenoid is actuatable to move a plunger in a fore and aft direction. A rocker is pivotally mounted to the housing and is connected to the plunger. A shift fork slidably mounted on a translation pin extending from the housing, the shift fork including a channel for receiving an end of the rocker, wherein activation of the solenoid causes pivotal movement of the rocker to cause the shift fork to translate along the translation pin.

26 Claims, 25 Drawing Sheets

(56) References Cited

U.S. PATENT DOCUMENTS

| | | | |
|---|---|---|---|
| 2022/0381340 | A1 | 12/2022 | Pellmann et al. |
| 2023/0302848 | A1 | 9/2023 | Averill et al. |
| 2024/0100944 | A1 | 3/2024 | Yoder et al. |

* cited by examiner 44
73
48a
72
70
71
52

46

72
70
71
44
73
48a
50
52
40

INTEGRATED WHEEL END SYSTEM

CROSS-REFERENCE TO RELATED APPLICATIONS

This application claims the benefit of U.S. Provisional Application No. 63/611,385, filed on Dec. 18, 2023. The entire disclosure of the above application is incorporated herein by reference.

FIELD

The present disclosure relates to an integrated wheel end system and more particularly, to an actuator for initiating the shifting action of a clutch to affect engagement/disengagement of drive and driven shafts.

BACKGROUND

This section provides background information related to the present disclosure which is not necessarily prior art.

In recent years it has become increasingly popular to provide vehicles with the ability to convert between two-wheel and four-wheel drive. As popularity has grown, so to have the many ways of affecting conversion. In one example there is a permanently driven drive line segment to the rear wheels of a vehicle, and a part-time driven drive line segment to the front wheels. The part-time driven drive line segment is simply disconnected/decoupled from the engine's drive shaft at the transmission or transfer case and that segment is rendered passive (undriven).

There is often a second point of disconnection which may be at or near the differential (a center disconnect) or at both wheels. There is a mechanical action that takes place to achieve each connection and disconnection as contemplated herein. Two shafts or drive line segments are in close relationship and a clutch ring that is permanently coupled to one shaft is slidable into engagement with the other shaft to couple the shafts and is slidable out of engagement with the other shaft to decouple the two shafts.

The sliding movement is achieved by what will here be referred to as an actuator. The actuator can be many types including, e.g., a shift lever, manual hand operated, magnetically actuated, electrically actuated, cam actuated, or pneumatically actuated.

SUMMARY

This section provides a general summary of the disclosure, and is not a comprehensive disclosure of its full scope or all of its features.

According to an aspect of the present disclosure, an actuator for a wheel end disconnect system includes a housing and a solenoid mounted to the housing, the solenoid is actuatable to move a plunger in a fore and aft direction. A rocker is pivotally mounted to the housing and having a first end connected to the plunger. A shift fork is slidably mounted on a translation pin extending from the housing, the shift fork including a channel for receiving a second end of the rocker, wherein activation of the solenoid causes pivotal movement of the rocker to cause the shift fork to translate along the translation pin.

According to another aspect, the channel is V-shaped.

According to another aspect, the translation pin is parallel to the direction of movement of the plunger.

According to another aspect, the channel extends on opposite sides of the translation pin.

According to another aspect, a bottom surface of the channel is aligned with the translation pin.

According to another aspect, the second end of the rocker includes a cutout to define a pair of legs that straddle the translation pin.

According to another aspect, the rocker includes a pair of pivot arms for mounting the rocker to the housing.

According to another aspect, a magnet is mounted to the shift fork and a sensor is mounted to the housing for sensing a position of the magnet on the shift fork relative to the housing.

According to another aspect, the shift fork includes an anti-rotation feature for preventing the shift fork from rotating relative to the translation pin.

According to another aspect, a clutch ring is connected to the shift fork.

According to another aspect, a control unit is provided for controlling the solenoid and for receiving position signals from the sensor.

According to another aspect, during a controlled shift of the wheel end disconnect system, the control unit receives signals from the sensor and if the sensor signal indicates that the desired shift is not achieved within a predetermined time period, the shift control is halted.

According to another aspect, the control unit received command signals from a vehicle interface.

According to another aspect, the control unit is mounted to a printed circuit board of the actuator.

According to another aspect, the sensor is mounted to the printed circuit board.

According to another aspect, the solenoid includes a first coil driver for operating a first coil of the solenoid in a first direction and a second coil driver for operating a second coil of the solenoid in a second direction.

According to another aspect, during a shift, a current to one of the first and second coils is approximately ⅓ of the current to the other of the first and second coils.

According to another aspect, the solenoid has an operating current of less than or equal to 7 A.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
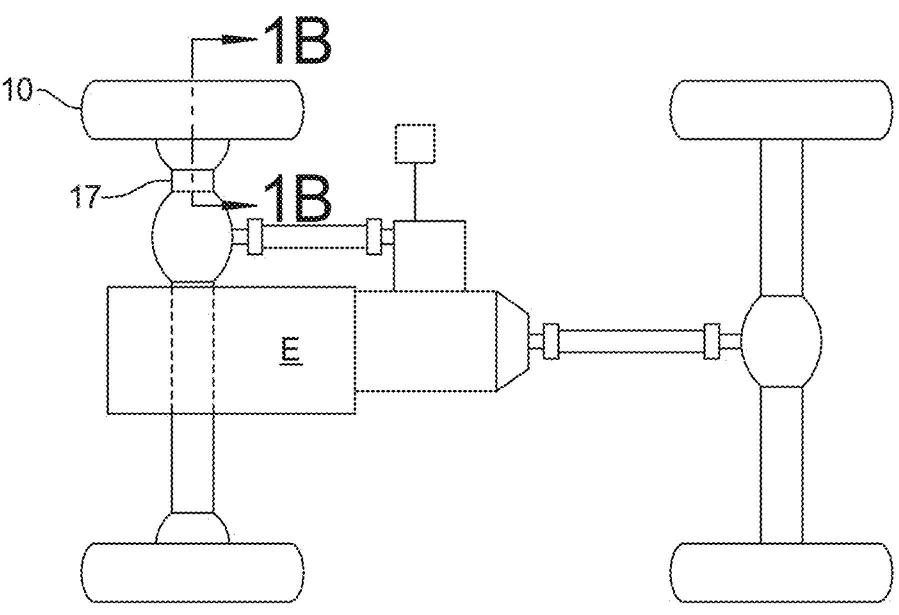
FIGS. 1A and 1B illustrate a vehicle and a wheel end of the vehicle for which the present disclosure is contemplated.
Figure 1B:
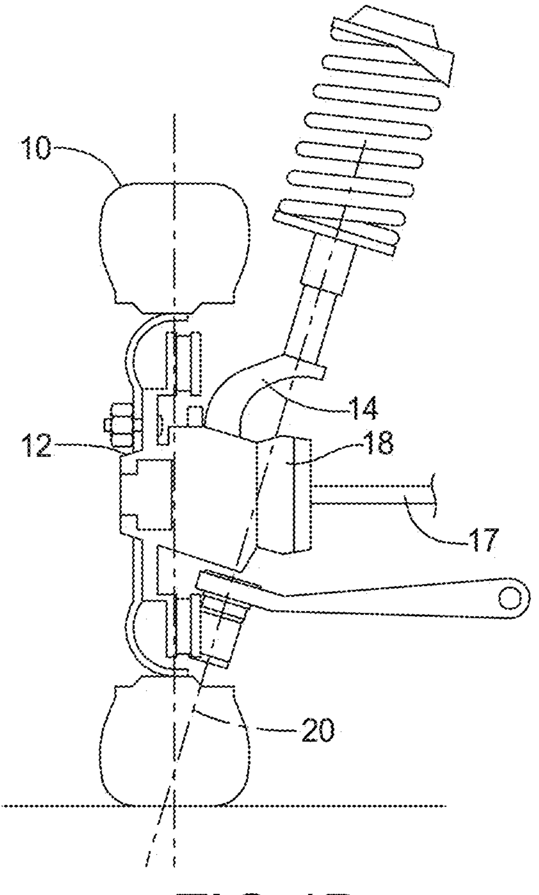

FIG. 1A schematically illustrates a vehicle chassis including front wheels 10 as may incorporate a clutch actuator assembly of the present disclosure. FIG. 1B is a partial view as taken along lines 1B-1B of FIG. 1A and illustrates a front wheel 10 having a hub 12 extended inward where it is supported by a steering knuckle 14. A bearing pack (not shown) allows rotation of the wheel 10 relative to the steering knuckle 14. As shown in FIG. 1B, a drive axle 17 (of the vehicle drive train) connects to a CV-joint 18 which is secured to the knuckle. As is well known in the industry, the CV-joint 18 is adapted to accommodate the pivotal axis 20 of the wheel 10 and knuckle 14 whereby turning of the front wheel is permitted while remaining in driving engagement with the axle 17.

The CV-joint 18 includes an axle portion that is configured to provide an annular portion having splines that are in mating alignment with splines provided on a coupler. It will thus be apparent that the CV-joint 18 is rotatably supported in the hub 12 which is rotatably supported in the knuckle 14.

A clutch ring 40 engages with both spline sets of the CV-joint 18 and the coupler, respectively. In this relation, the CV-joint (driven by axle 17) drives the wheel hub 12 and accordingly wheel 10. The clutch ring 40 is, however, slidable to disengage from the coupler thereby disengaging wheel 10 from the drive axle 17. Such sliding movement of the clutch ring 40 is provided by an actuator assembly 42.

Figure 4:
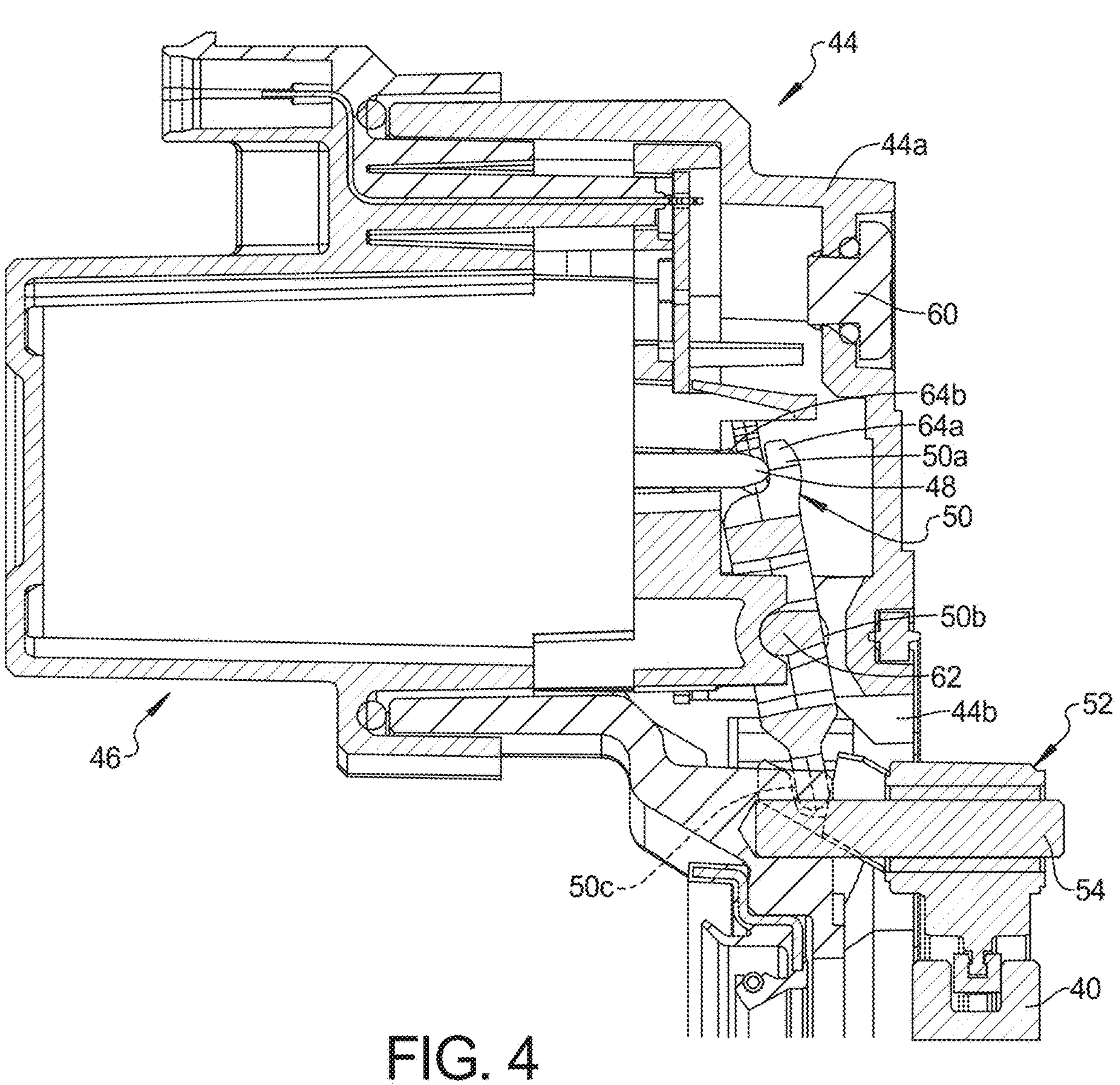
FIG. 4 is a cross-sectional view of the actuator shown with the solenoid retracted and the shift fork extended in a 4 wheel drive operating mode.
Figure 5:
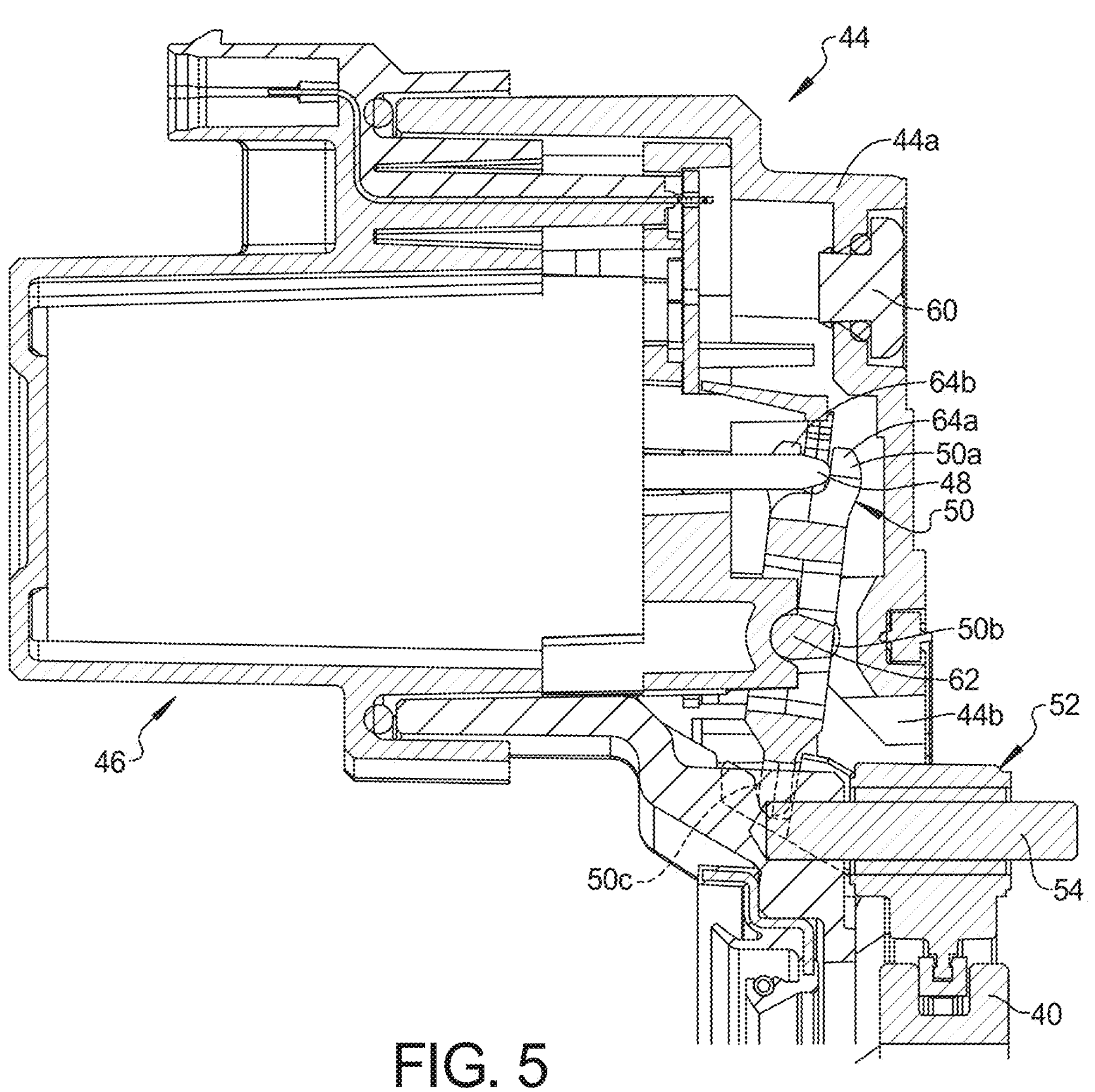
FIG. 5 is a cross-sectional view of the actuator shown with the solenoid extended and the shift fork retracted in a 2 wheel drive operating mode.

With reference to FIGS. 2-5, the actuator assembly 42 includes a housing 44 that can be mounted to the knuckle 14 in a wheel end disconnect system. A gasket 45 can be provided between the housing 44 and the knuckle 14. The housing 44 can include a recessed groove for receiving the gasket 45. The housing 44 can be made from aluminum and includes a solenoid portion 44*a* for mounting a solenoid 46. The housing 44 can include a pair of alignment pins 47 (best shown in FIGS. 2 and 3) that can be used to align the housing when the actuator assembly 42 is mounted to the knuckle 14. The solenoid 46 includes a plunger 48 (best shown in FIGS. 4 and 5 that engages a rocker 50. As shown in FIGS. 4 and 5, the rocker 50 is pivotally mounted to the housing 44 and is engaged with a shift fork 52. A vent 60 is provided in the housing 44.

Figure 2:
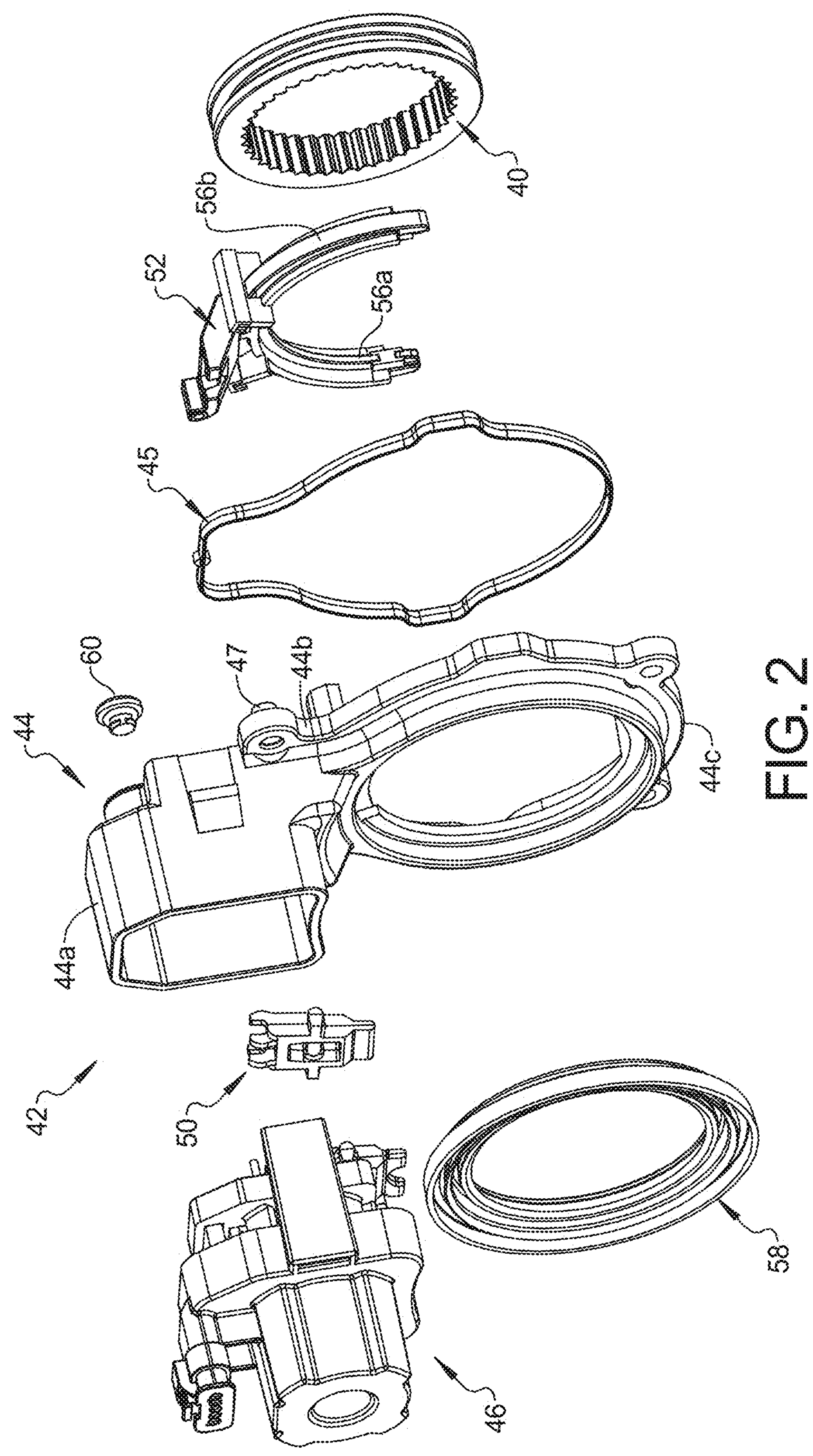
FIG. 2 is an exploded perspective view of the actuator of an integrated wheel end system according to the principles of the present disclosure.
Figure 3:
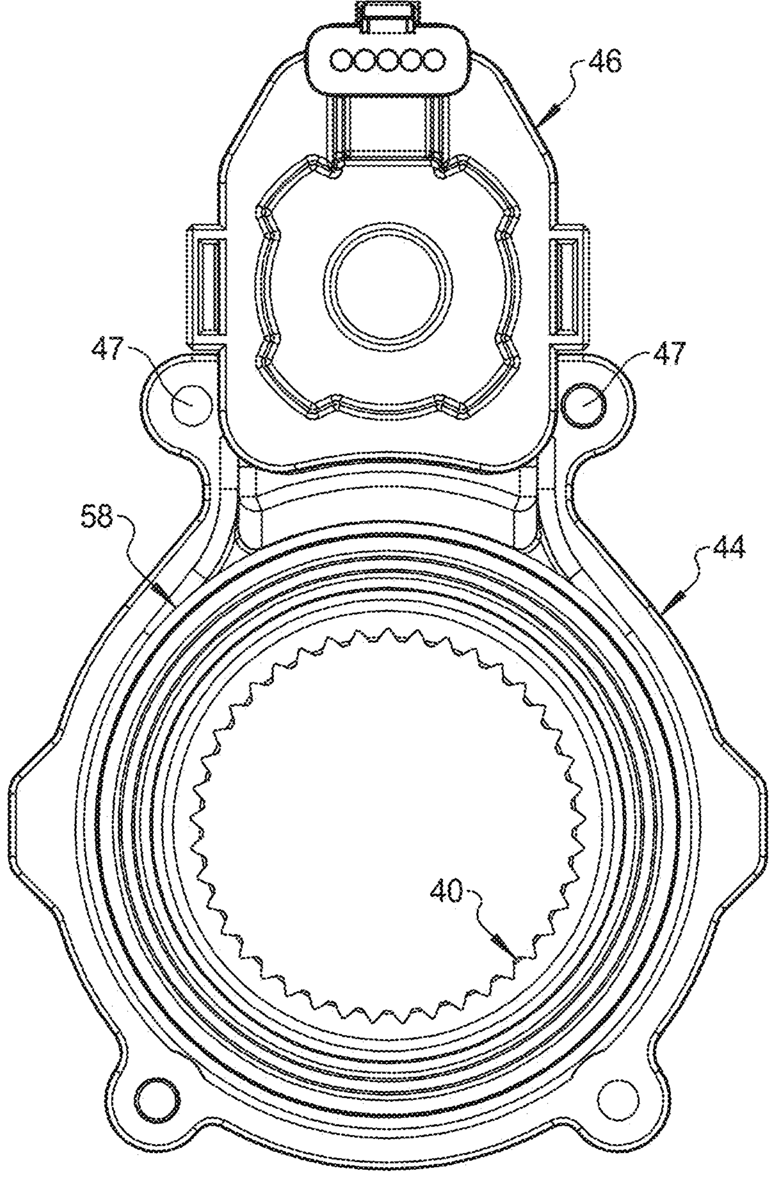
FIG. 3 is a plan view of the actuator shown in FIG. 2.

With reference to FIG. 4, the shift fork 52 is slidably supported on an elongated translation pin 54 extending from an intermediate portion 44*b* of the housing 44. The elongated translation pin 54 can extend parallel to an axis of rotation of the CV joint 18. When the solenoid 46 is actuated, the plunger 48 moves in fore and aft directions and pivots the rocker 50 to cause the shift fork 52 to translate along the translation pin 54. As best shown in FIG. 2, the shift fork 52 includes a pair of arms 56*a*, 56*b* that engage with the clutch ring 40 to move the clutch ring 40 from an engaged to a disengaged position and vice versa.

A shaft seal 58 is mounted to a shaft portion 44*c* of the housing 44. The shaft seal 58 engages the CV joint 18 which extends through the shaft portion 44*c* of the housing 44.

Figure 8:
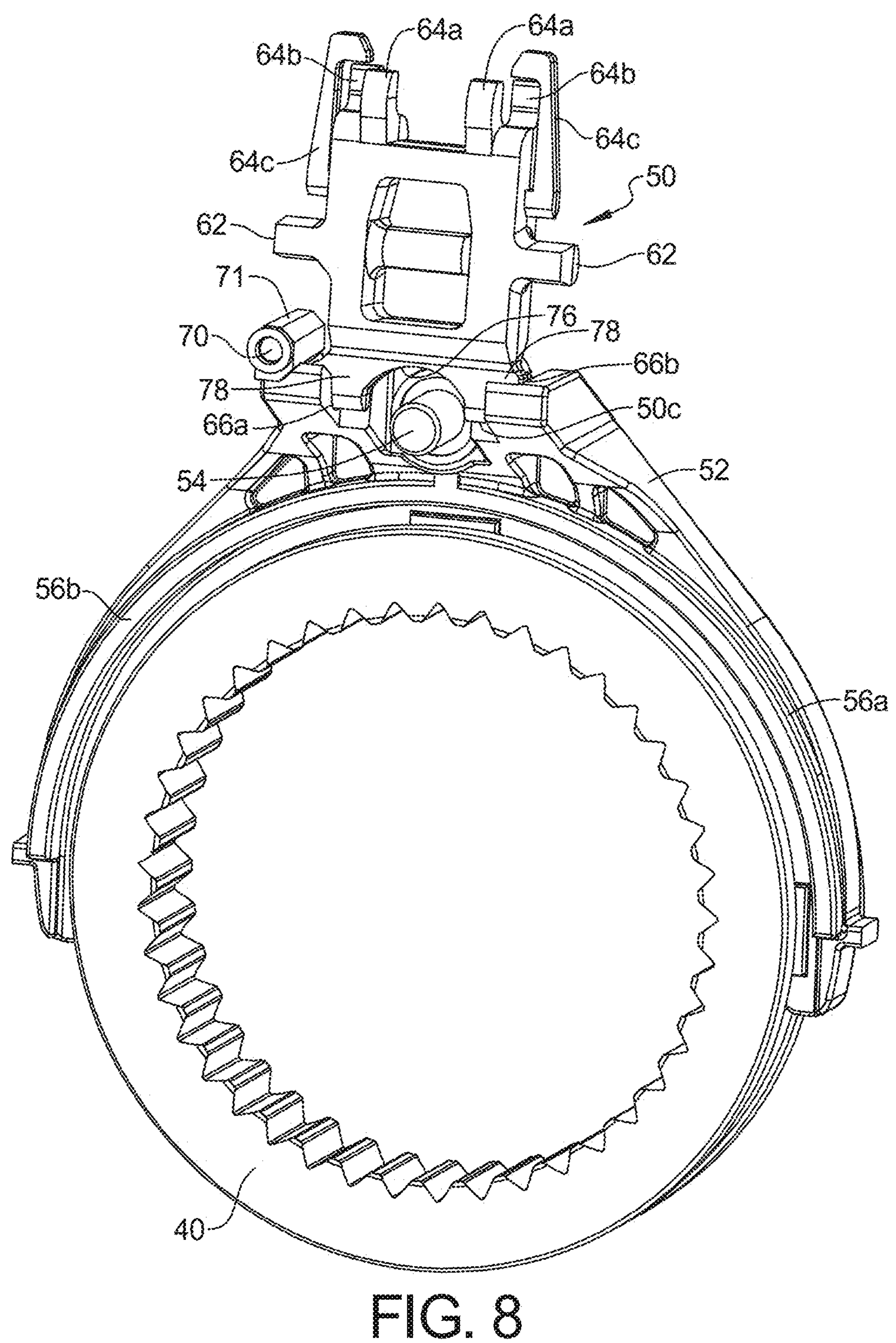
FIG. 8 is a detailed perspective view of the rocker according to the principles of the present disclosure.

The rocker 50 can be made from plastic or metal and can include a pair of integral pivot arms 62 extending from a mid-portion 50*a* of the rocker 50. An upper end 50*b* of the rocker 50 includes snap engagement members 64*a*, 64*b* for engagement with a cross pin 48*a* of the plunger 48. As shown in FIG. 8, a pair of optional latches 64*c* are provided for engaging a top end of the cross pin 48*a* of the plunger 48. The pair of latches 64*c* have a tapered inner face to facilitate insertion of the cross pin. The pair of latches 64*c* can flex laterally outward when the cross pin is inserted and snap back to secure the cross pin in place. A lower end 50*c* of the rocker 50 includes a rounded interface for engagement with a V-shaped channel 66 in an upper surface of the shift fork 52.

Accordingly, in operation, the rocker 50 is pivotally mounted to the housing 44 and the cross pin 48*a* of the plunger 48 of the solenoid 46 is connected to the snap engagement members 64*a*, 64*b* for allowing the solenoid to move the rocker 50 in a pivoting motion. As the rocker 50 is pivoted, the lower end 50*c* of the rocker 50 moves the shift fork 52 linearly along the translation pin 54. FIG. 4 shows the plunger 48 retracted so that the shift fork 52 is extended and FIG. 5 shows the plunger 48 extended so that the shift fork 52 is retracted. Accordingly, the shift fork 52 moves linearly to laterally shift the clutch ring 40 from an engaged to disengaged mode and vice versa. The linear movement of the shift fork 52 creates a more durable design and requires less space and less material as compared to a pivoting shift fork design. The rocker 50 allows for an optimal design fit to the vehicle knuckle 14 as well as an easy customizable rocker profile to accommodate different sized half shaft axles, or solenoids/actuators.

The mass of the clutch ring 40 and the plunger 48 of the solenoid 46 move in opposite directions thereby balancing loads due to vehicle lateral acceleration (G-loading). The G-loading can be important in that the G-loading can induce an involuntary disconnect shift if the resultant forces are not balanced. The design provides flexibility to offset and change the angle of the solenoid 46 from the axle centerline. The design also positions the line of force between the rocker 50 and the shift fork 52 very close to the shift fork translation pin 54, thereby eliminating translation stiction. The use of the rocker 50 may be applicable to other disconnects including a differential disconnect.

The solenoid 46 can be "bi-stable" with a magnetic latching mechanism so that current is not needed when the solenoid is extended or retracted. However, a mono-stable solenoid may also be used.

Figure 7:
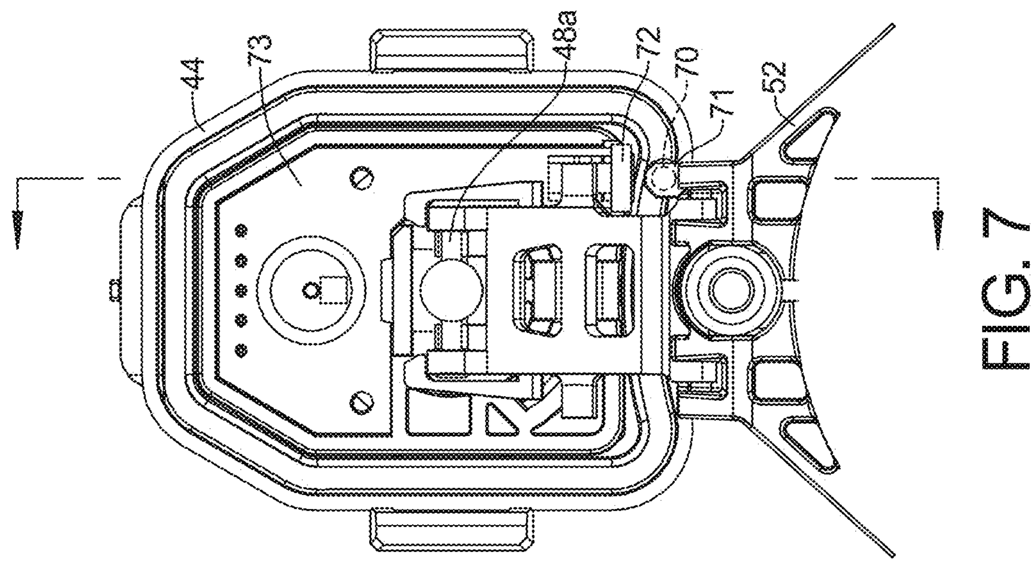
FIG. 7 is a detailed front plan view of the position detection system for the actuator.
Figure 6:
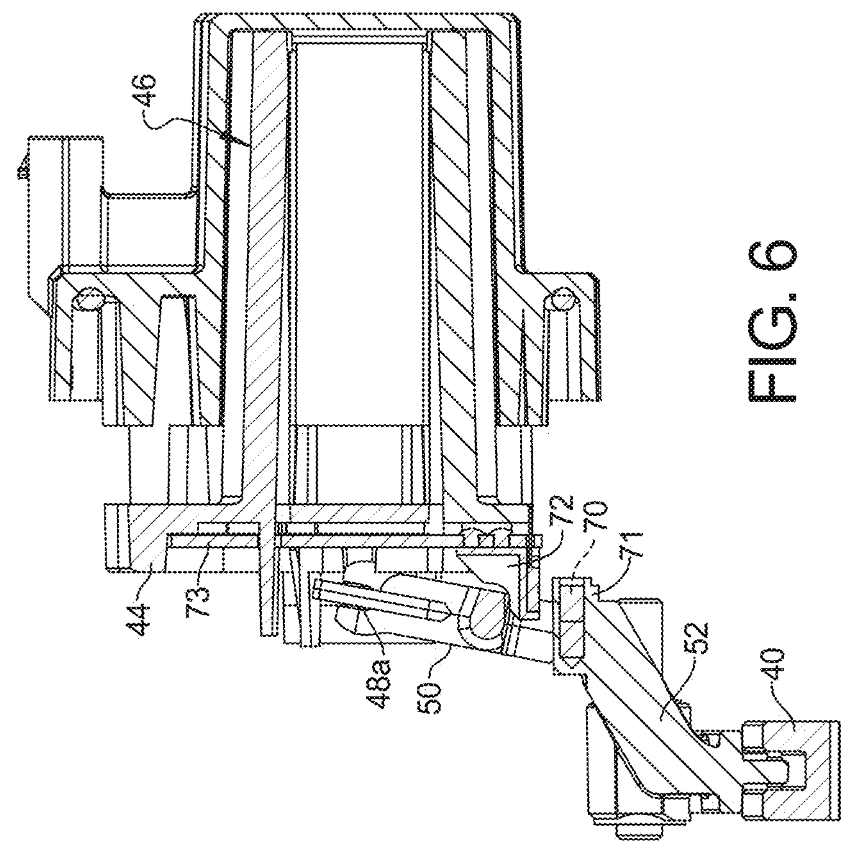
FIG. 6 is a detailed side plan view of a position detection system for the actuator.

With reference to FIGS. 6 and 7, a magnet 70 is mounted to an upward extending arm 71 of the shift fork 52. The magnet 70 is movable with the shift fork 52 relative to a sensor 72 that senses the position of the magnet on the shift fork 52. The sensor 72 can be used to provide positional feedback to a controller, as will described herein. The sensor 72 can be mounted/grounded to the housing 44 or to a printed circuit board 73 that is mounted to the housing 44.

Figure 13:
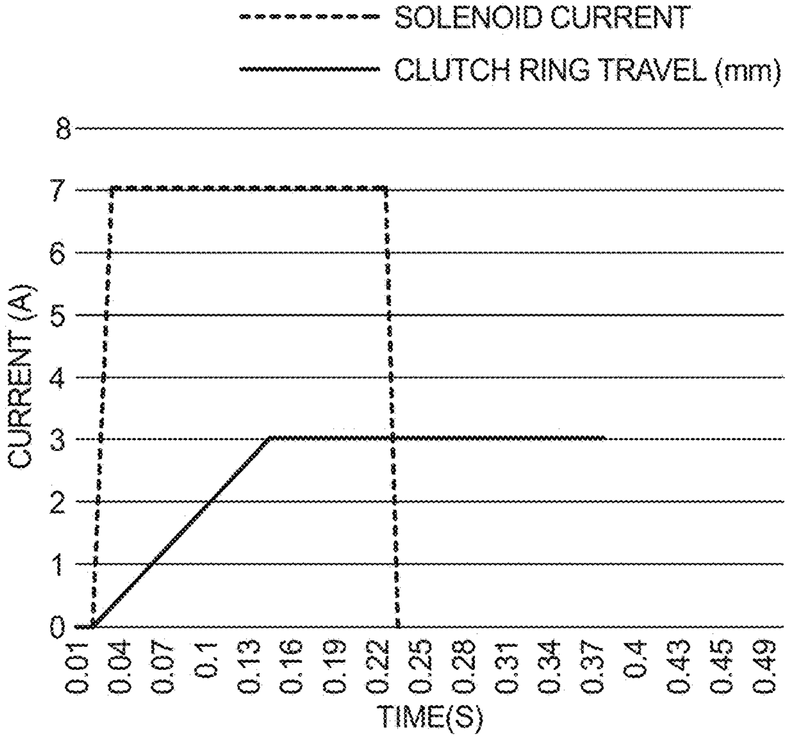
FIG. 13 is an example graph of solenoid current and clutch ring travel over time for a blocked or pinched shift.

During four-wheel drive engagement, the actuator 42 of the wheel end disconnect system is activated to move the clutch ring 40 to an engaged state, as shown in FIG. 4. The solenoid 46 is energized and retracts the plunger 48 to pull the rocker 50. The rocker 50 rotates and pushes on the shift fork 52. The shift fork 52 translates and translates the clutch ring 40 along the shaft splines engaging the clutch ring 40 to the coupler. If the clutch ring splines are blocked, preventing the clutch ring 40 from completing translation on the shaft, the solenoid shift times out, as shown in the graph of FIG. 13, and a retry procedure is executed. A retry procedure is not performed until a second predetermined period of time has passed. When the solenoid plunger 48 is at zero air gap, a permanent magnet holds the plunger in a latched position with the wheel end disconnect in an engaged state.

During four-wheel drive to two wheel drive disengagement (as shown in FIG. 5), the solenoid 46 is energized to extend the plunger 48 to push the rocker 50. The rocker 50 rotates and pulls on the shift fork 52. The shift fork 52 translates and translates the clutch ring 40 along the shaft splines disengaging the clutch ring 40 from the coupler. If the clutch ring splines are pinched, preventing the clutch ring 40 from completing translation on the shaft, the solenoid shift times out, as shown in the graph of FIG. 13, and a retry procedure is executed. When the solenoid plunger 48 is at zero air gap, a permanent magnet holds the plunger in a latched position with the wheel end disconnect in a disengaged state. In an alternative embodiment, as shown in FIG. 40, the magnetic latching mechanism may instead be a mechanical latch, including one which operates like the well-known "click pen" stepped cam operation. In an alternative embodiment, the mechanical latching mechanism may be located near the tail of the solenoid plunger which extends beyond the solenoid. The extended tail of the solenoid plunger may be fixed to a plate which may engage or disengage with a latching mechanism located between the housing and the solenoid. The solenoid may be biased or spring-loaded so that it is stable in the engaged or disengaged positions (bi-stable). In this embodiment, a manual override may be configured such that in the event of power loss, the solenoid plunger may be manually actuated to stimulate engagement or disengagement. These latching embodiments may enable the solenoid to generate higher forces within the same packaging space, and they are not limited to one type of vehicle disconnect. These solenoid latching mechanisms could also be implemented in any type of vehicle disconnect such as an axle disconnect, or differential disconnect.

With reference to FIG. 8, the lower end 50*c* of the rocker 50 can include a center cutout region 76 that allows the point of actuation with the shift fork 52 to be as close to in line with a center of the linear shaft axis as possible so that binding of the shift fork 52 to the translation pin 54 is effectively eliminated. The center cutout region 76 defines two legs 78 at the lower end 50*c* of the rocker 50 that straddle the translation pin 54. In FIG. 8, the V-shaped channel 66 of the shift fork 52 is also located to have separate channel portions 66*a*, 66*b* that are on opposite sides of the translation pin 54.

Figure 9:
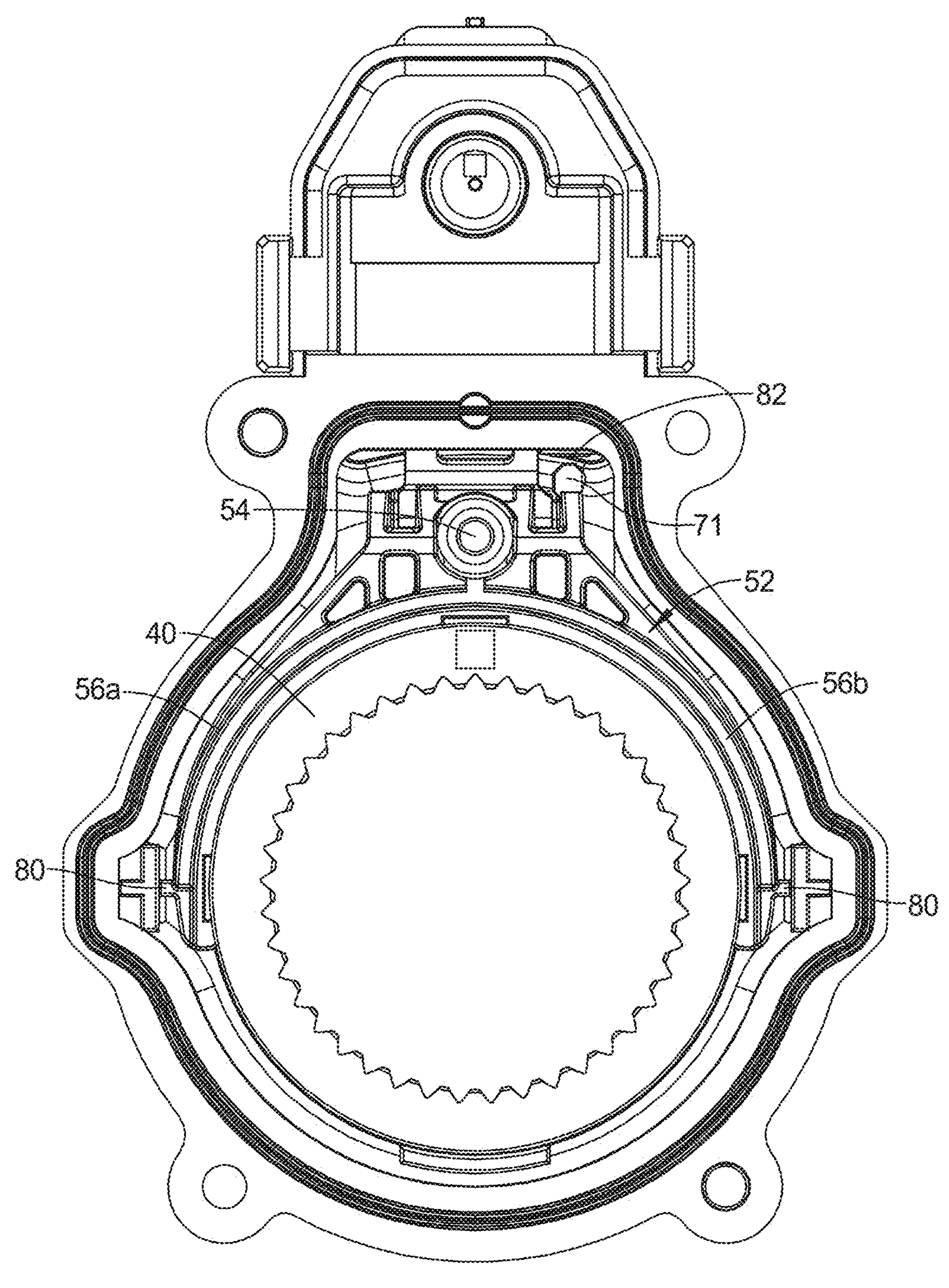
FIG. 9 is a plan view of the shift fork according to the principles of the present disclosure.

With reference to FIG. 9, the shift fork 52 can include an anti-rotation stop in the form of a protrusion 80 on each arm 56*a*, 56*b* to prevent rotation of the shift fork 52 about the elongated translation pin 54. The protrusions 80 prevent the rotation of the shift fork in order to maintain a proper air gap of the magnet 70 with the sensor 72 at location 82.

Figure 10:
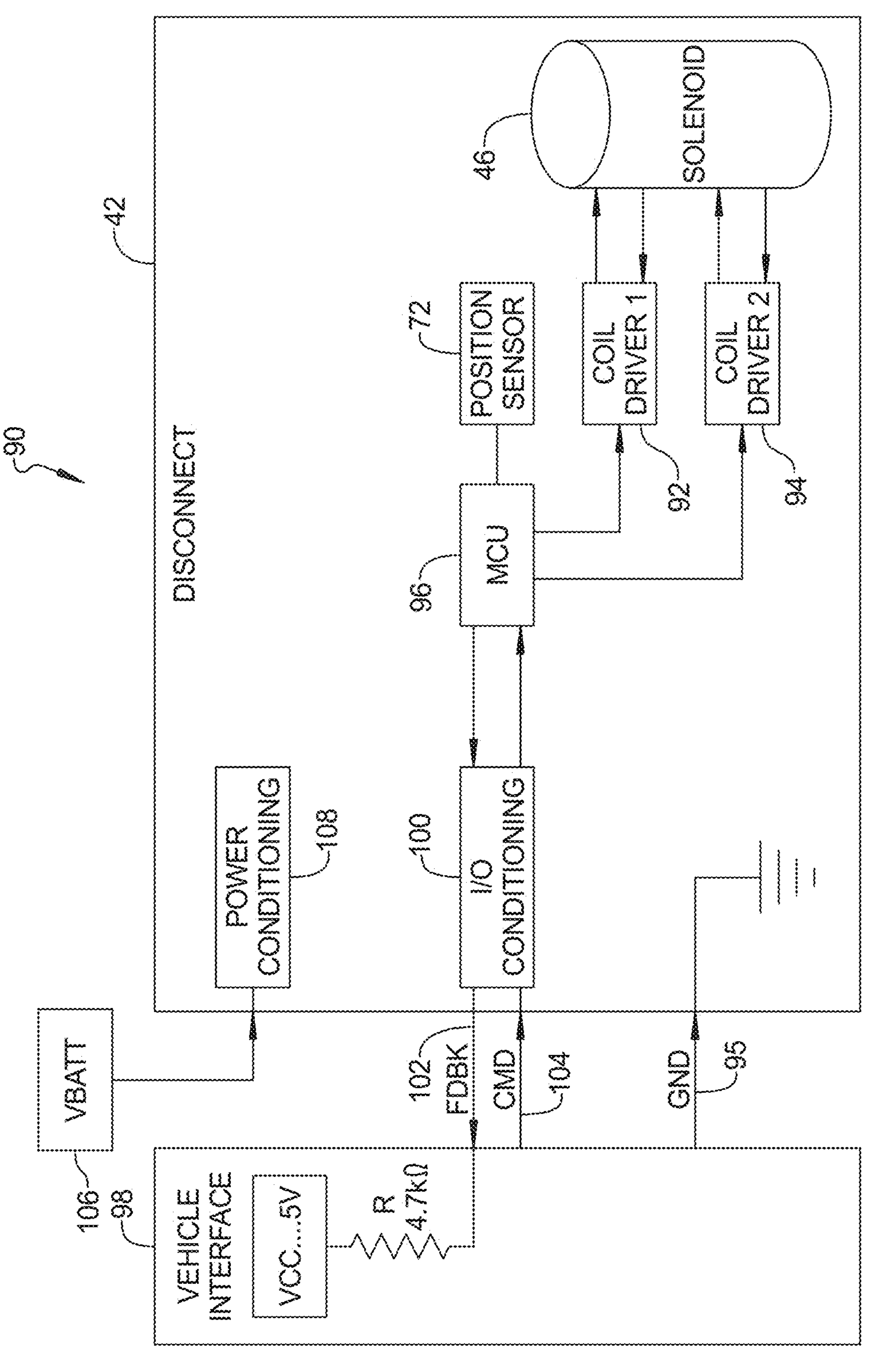
FIG. 10 is a schematic view of an implementation of external controls for the actuator.

With reference to FIG. 10, an example of a control circuit 90 for controlling the actuator assembly 42 of the wheel end disconnect system will be described. The control circuit 90 includes the solenoid 46 including a first coil driver 92 and a second coil driver 94 each operated by a control unit (MCU) 96. The first coil driver 92 and the second coil driver 94 each include a power terminal and a common ground 95. The current is limited to 7 A externally. The two coils of the bi-stable solenoid 46 can be controlled by flipping the polarity of the voltage between the two terminals for extending or retracting the plunger 48. The external circuitry will limit one of the coils to approximately ⅓ of the current of the other in order to deliver a larger total current to the coil mainly responsible for actuation of the shift. The coil with approximately ⅓ the current is mainly responsible for negating the magnetic flux produced by the permanent magnet, thus requiring much less current. The position sensor 72 provides position signals to the control unit 96. A vehicle interface 98 is provided in communication with the control unit 96 by an input/output conditioning circuit 100 to provide feedback signals 102 to the vehicle interface 98 and to receive command signals 104 from the vehicle interface 98. The vehicle interface 98 can include a touch screen, a button, a toggle switch or other indicator of the driver's desired two-wheel drive or four wheel drive vehicle operating condition. The control circuit 90 of the actuator assembly 42 can receive power from the vehicle battery 106 via a power conditioning circuit 108. With the control circuit 90, the actuator assembly control unit 96 is implemented in the actuator assembly and external to the vehicle control system.

Figure 11:
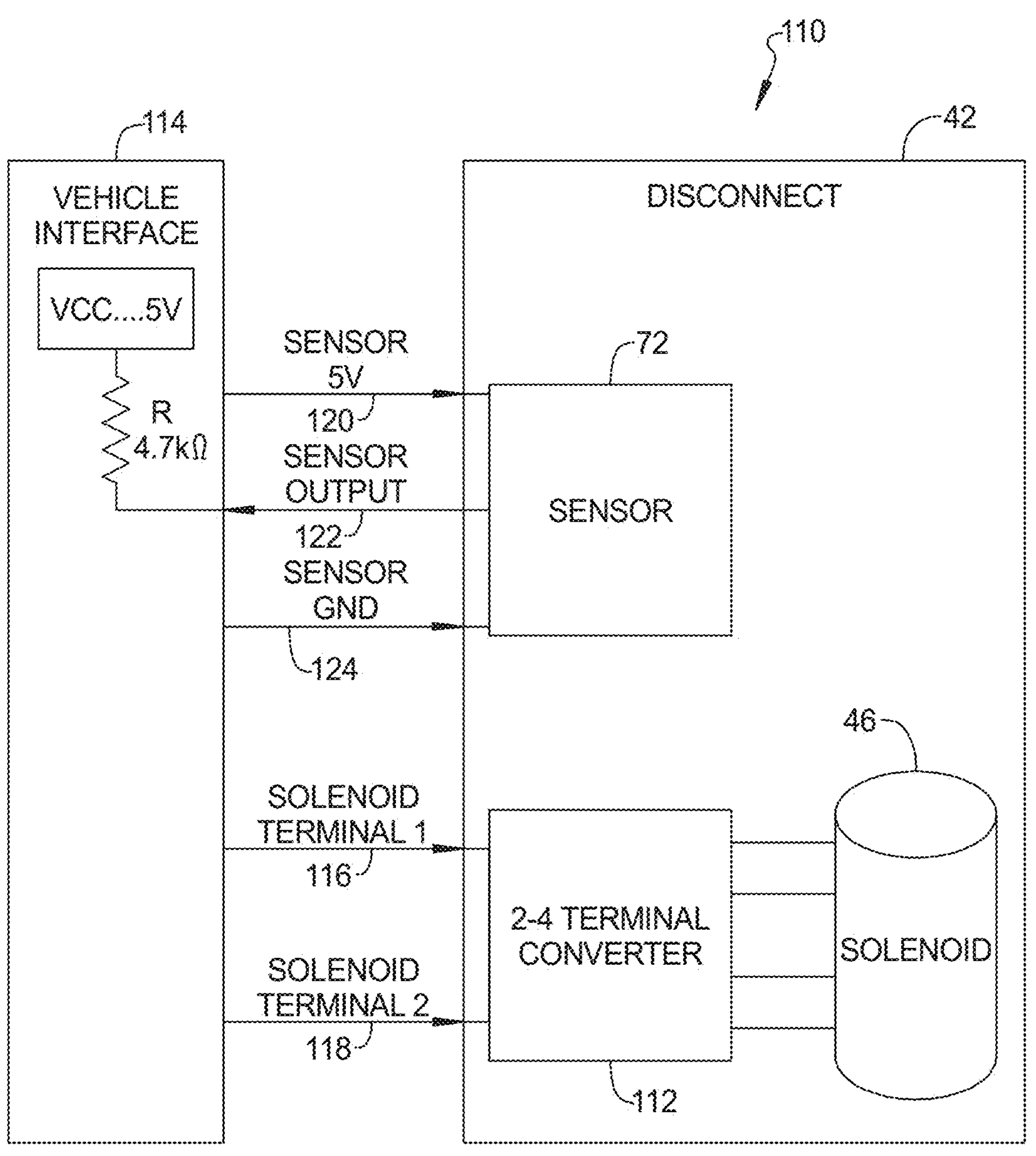
FIG. 11 is a schematic view of an implementation of internal controls for the actuator.

With reference to FIG. 11, an alternative control circuit 110 for controlling the actuator assembly 42 includes a solenoid 46 that is operated by a 2-4 terminal converter 112 that receives operating signals from a vehicle interface 114 that includes a first solenoid terminal 116 and a second solenoid terminal 118. The 2-4 terminal converter converts the operating signals from the first solenoid terminal 116 and the second solenoid terminal for operating the solenoid in either of the engaged or disengaged directions. The current is limited to 7 A via a closed loop pulse width modulated control. The pulse width modulated closed loop current control is also used to limit the current of one of the solenoid coils to approximately ⅓ the current of the other coil. The other coil is limited to a much higher current (approximately 6 A) using the same strategy as long as the total current is under 7 A. The control of the two coils switches depending on if the requested command is to retract or extend the solenoid plunger 48. The sensor 72 receives a regulated 5V power supply 120 from the vehicle interface 114. The sensor 72 provides feedback signals 122 to the vehicle interface 114 and is also grounded at 124 through the vehicle interface 114.

Figure 26:
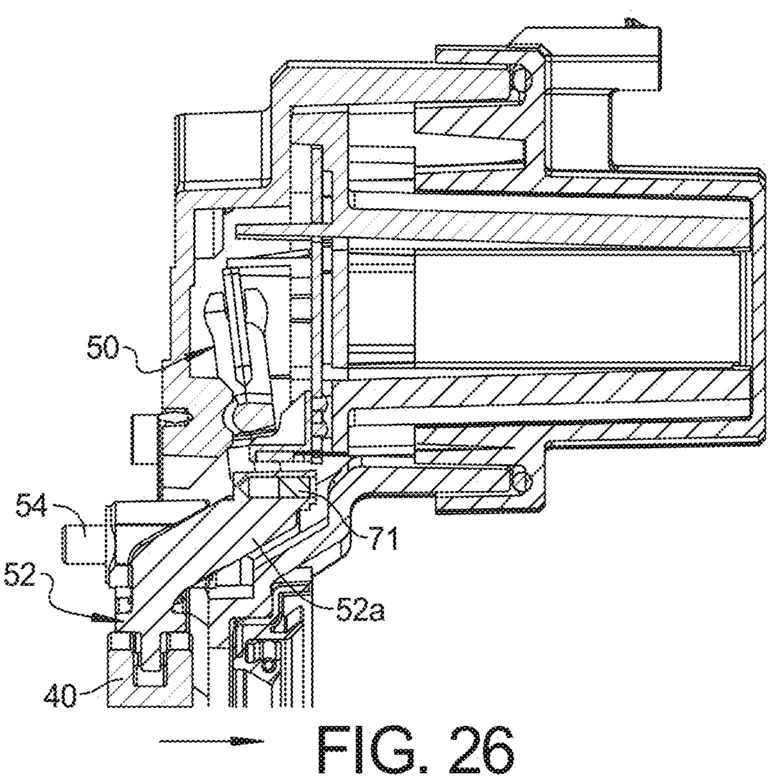
FIG. 26 is a cross sectional view of the actuator showing the location of the position sensor magnet with the shift fork in a retracted position.
Figure 27:
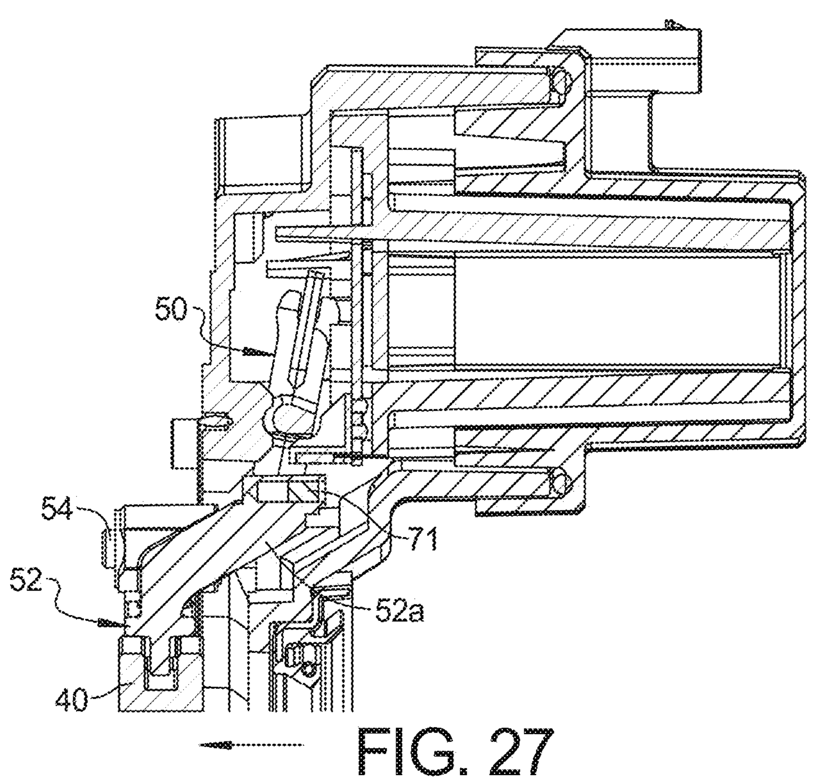
FIG. 27 is a cross sectional view of the actuator showing the location of the position sensor magnet with the shift fork in an extended position.

With reference to FIGS. 26 and 27, the magnet 71 is shown mounted within an arm **52*a* of the shift fork 52. The magnet 71 and shift fork 52 are illustrated in a retracted position in FIG. 26 and in an extended position in FIG. 27. The sensor 72 reads the position of the magnetic field for the magnet 71 that is embedded in the shift fork 52. The position of the shift fork 52 controls the position of the clutch ring 40** between an engaged and a disengaged position.

Figure 12:
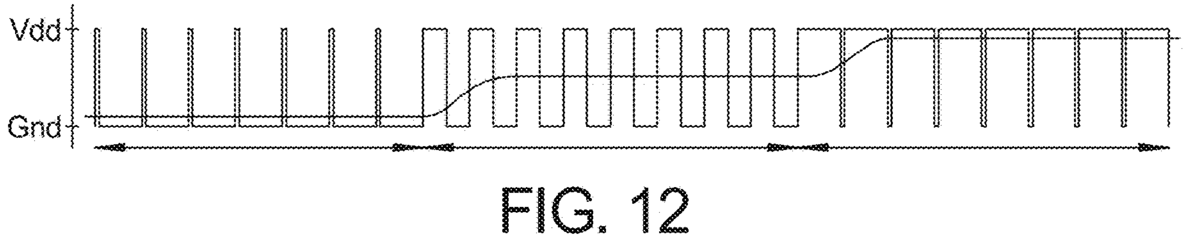
FIG. 12 is an example graph of the clutch ring positional feedback according to the principles of the present disclosure.

As shown in FIG. 13, the control of the actuator assembly 42 can time-out after a predetermined period of time if the engagement or disengagement of the clutch ring 40 is not confirmed by the sensor 72. As shown in FIG. 12, when the actuator 42 of the wheel end disconnect is actuated and the clutch ring 40 moves along the splines, the sensor 72 detects the position of the magnet 70. The sensor 72 sends out a pulse width modulated signal relaying where the clutch ring 40 is in the translation from engaged to disengaged, and vice versa. By way of example, as shown in FIG. 12, at less than 15% the wheel end disconnect is disengaged, at 15-84% is where the clutch ring position is in translation from disengaged to engaged and at greater than 85%, the wheel end disconnect is engaged.

Figures 14, 15:
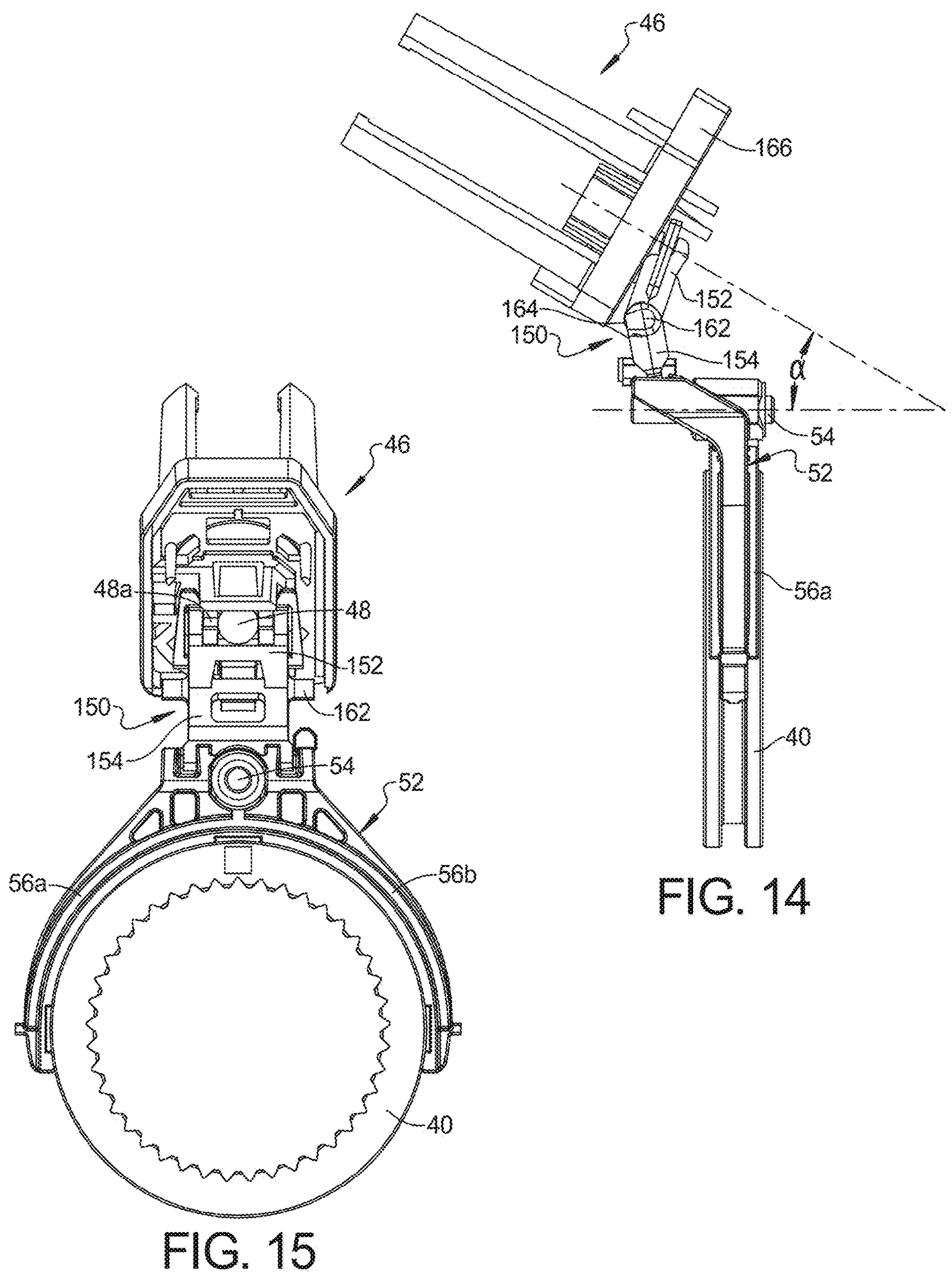
FIG. 14 is a side plan view of the actuator having a rocker configured for the solenoid to be oriented at different angles.
FIG. 15 is a front plan view of the actuator having a rocker configured for the solenoid to be oriented at different angles.

The rocker profile can be modified to allow the design to be reconfigured for optimal fit to the vehicle knuckle. With reference to FIGS. 14 and 15, the solenoid 46 can be reoriented at different angles for a better fit to the wheel end packaging. As shown in FIG. 14, the solenoid 46 is oriented with the plunger 48 at an example angle $\alpha$ of between 25 and 35 degrees from an axis of the translation pin 54. The rocker 150 has an upper portion 152 above the pivot arms 162 that is angled relative to a lower portion 154 below the pivot arms 162. The pivot arms 162 are mounted to a mount structure 164 of the solenoid mount 166. The angle between the upper portion 152 and the lower portion can be the same or similar to the angle $\alpha$ of the plunger 48 relative to the translation pin 54. The angle of the solenoid 46 can be adjusted to allow up to a 90-degree orientation relative to the translation pin 54 by modifying the angle of the upper portion 152 of the rocker 150 relative to the lower portion 154. A connection between the upper end 152 of the rocker 150 and the plunger 48 and between the lower end 154 of the rocker 150 and the shift fork 52 can be the same as previous embodiments.

Figures 16, 17:
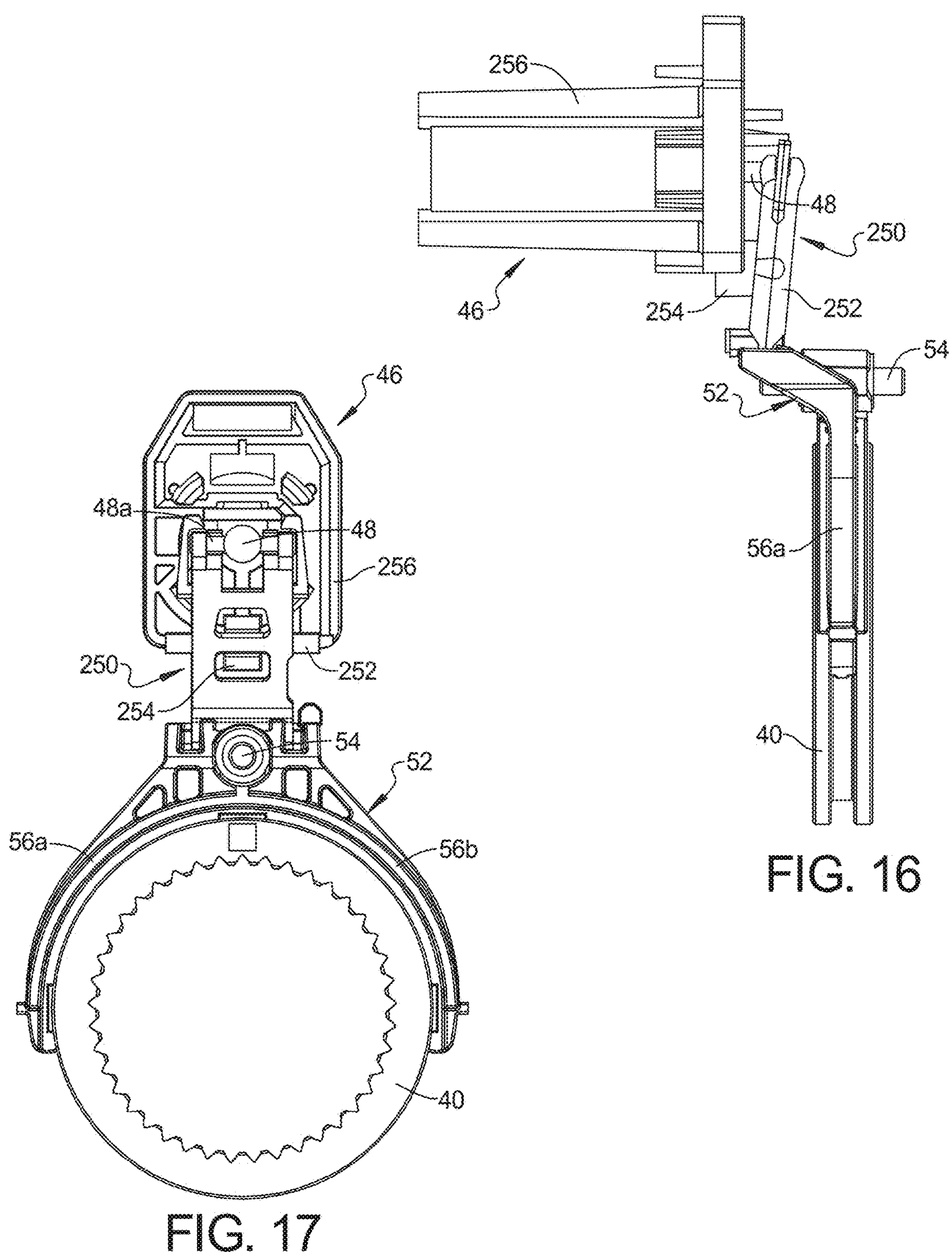
FIG. 16 is a side plan view of the actuator having a rocker configured for the solenoid to be located further away from the shift fork and clutch ring.
FIG. 17 is a front plan view of the actuator having a rocker configured for the solenoid to be located further away from the shift fork and clutch ring.

With reference to FIGS. 16 and 17, a height of the rocker 250 can be increased to allow for the solenoid 46 to be higher off the center axis of the translation pin 54 to allow more clearance for the half shaft. The rocker 250 can include a center pivot pin 252 that is clipped to a mount structure 254 that extends below the solenoid mount 256 of the solenoid 46. The mount structure is modified to accommodate for the longer height of the rocker 250.

Figures 18, 19:
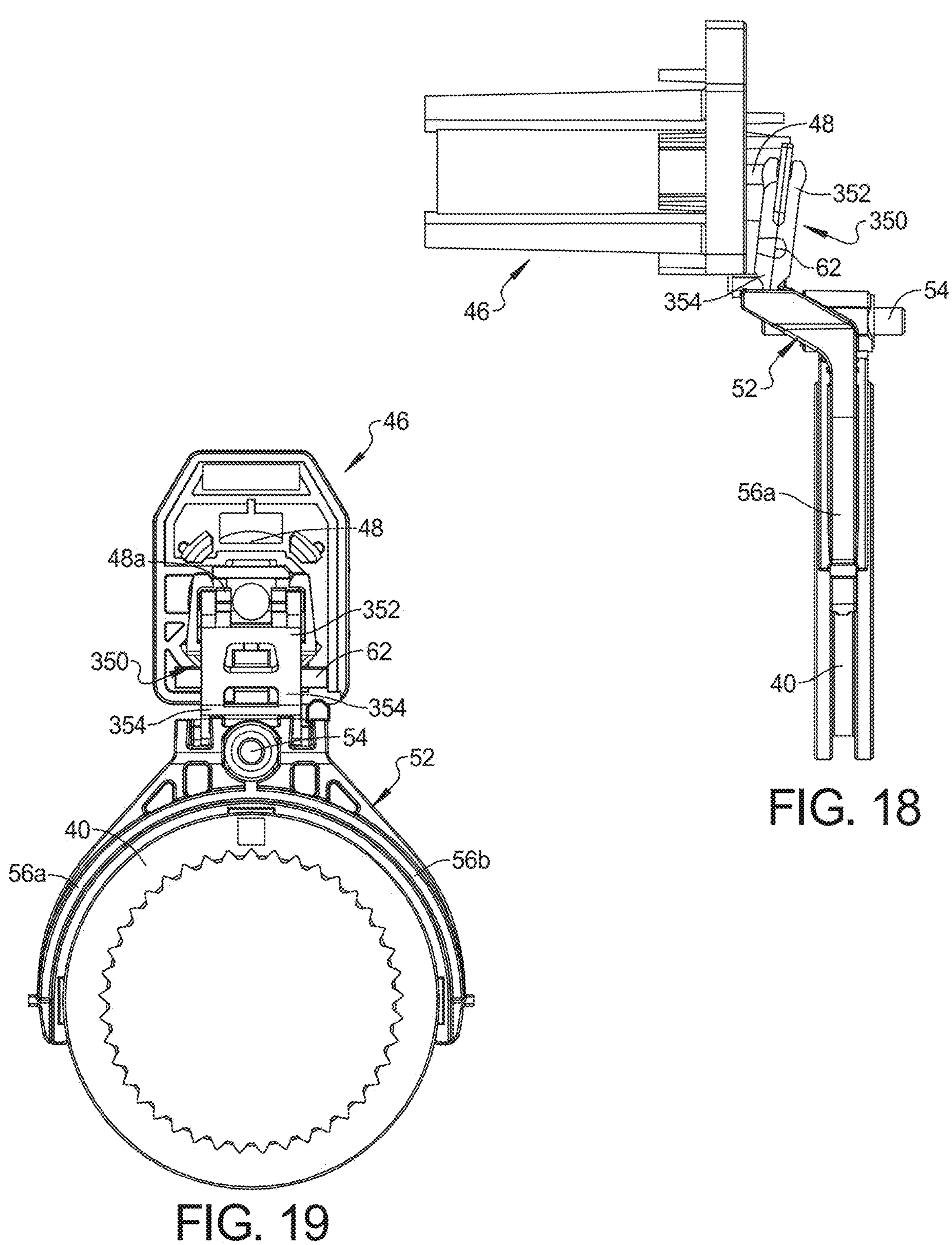
FIG. 18 is a side plan view of the actuator having a rocker configured to allow for a different ratio of solenoid stroke to shift fork throw.
FIG. 19 is a front plan view of the actuator having a rocker configured to allow for a different ratio of solenoid stroke to shift fork throw.

With reference to FIGS. 18 and 19, the rocker 350 can be tuned to allow for a different ratio of solenoid stroke to shift fork throw to be realized. This ratio may also be altered to optimize the shift force transferred between the actuator and the shift fork through the rocker 350. In the embodiment shown, the rocker 350 has an upper portion 352 above the pivot arms 162 that is longer than a lower portion 354 below the pivot arms 62. The longer upper arm portion 352 as shown is 1.25 times longer than the lower portion 354, although other ratios can be used. The longer upper arm portion 352 allows for full extension of the plunger 48 and provides a shorter travel of the shift fork 52 along the translation pin 54. Alternatively, the upper portion 352 of the rocker 350 could be made shorter than the lower portion 354 to allow a shorter solenoid stroke to result in a longer shift fork throw. Accordingly, modifying a ratio of the length of the upper portion 352 relative to the lower portion 354 of the rocker 350 allows for different packaging that may require more or less translation/throw of the clutch ring 40.

Figure 20:
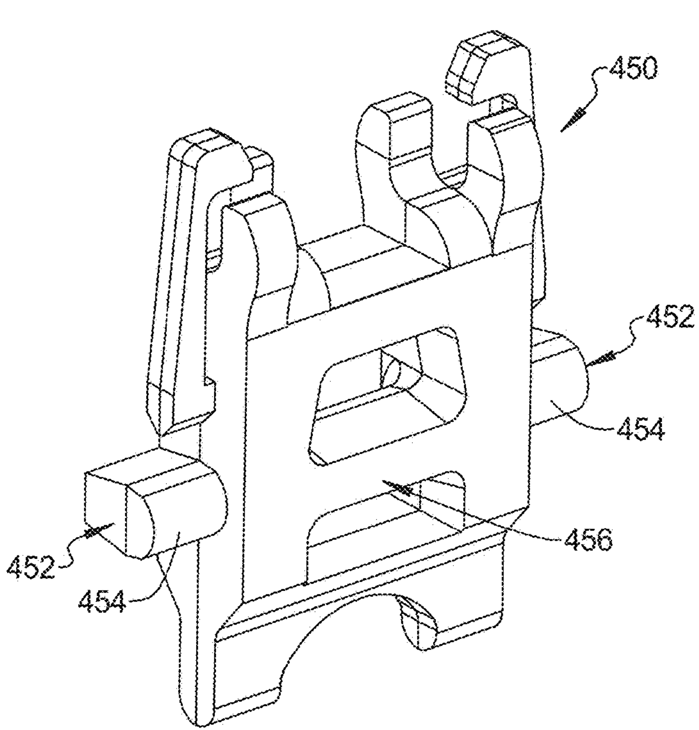
FIG. 20 is a front perspective view of a rocker according to an embodiment of the present disclosure.
Figure 21:
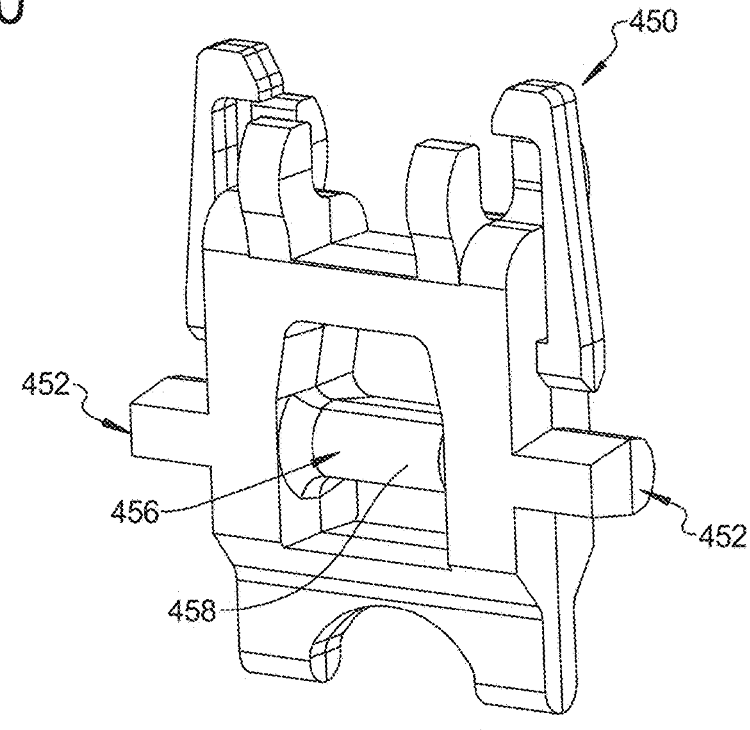
FIG. 21 is a rear perspective view of the rocker shown in FIG. 20.

With reference to FIGS. 20 and 21, the rocker 450 includes pivot arms 452 each with a partial cylindrical rocker pivot bearing face 454 on one side of the rocker and a center rocker pivot 456 with a partial cylindrical rocker pivot bearing face 458 on an opposite side of the rocker 450. Accordingly, providing pivot features on opposite sides of the rocker 450 allow for easier mounting with pivot slots of a front cover engaging the pivot arms and a pivot slot of the solenoid mount engaging the center rocker pivot 456 to pivotally entrap the rocker 450 therebetween when the front cover is assembled to the solenoid mount.

Figure 22:
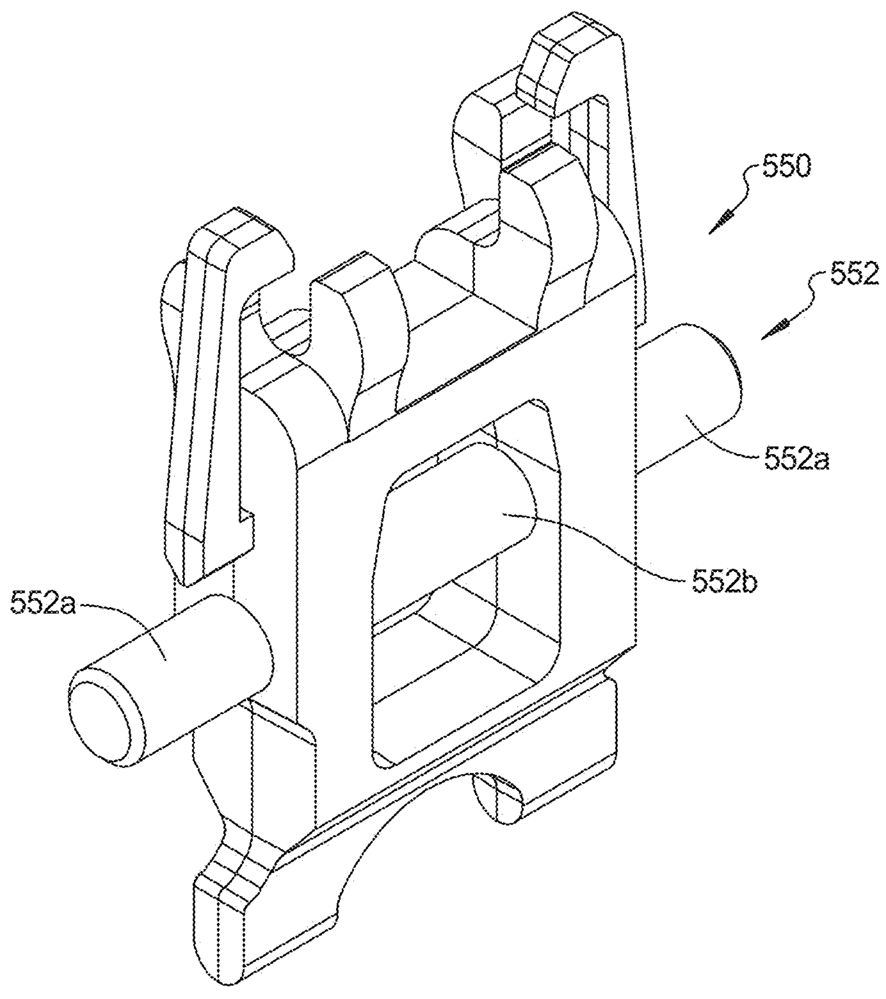
FIG. 22 is a front perspective view of a rocker according to an additional embodiment of the present disclosure.

With reference to FIG. 22, the rocker 550 may have a pivot shaft 552 in place of molded in trunnions. The pivot shaft 552 can be molded in or inserted through shaft openings formed or drilled in the rocker 550. The pivot shaft 552 defines a pair of pivot arms **552*a* and a center rocker pivot 552*b***.

Figures 23, 24:
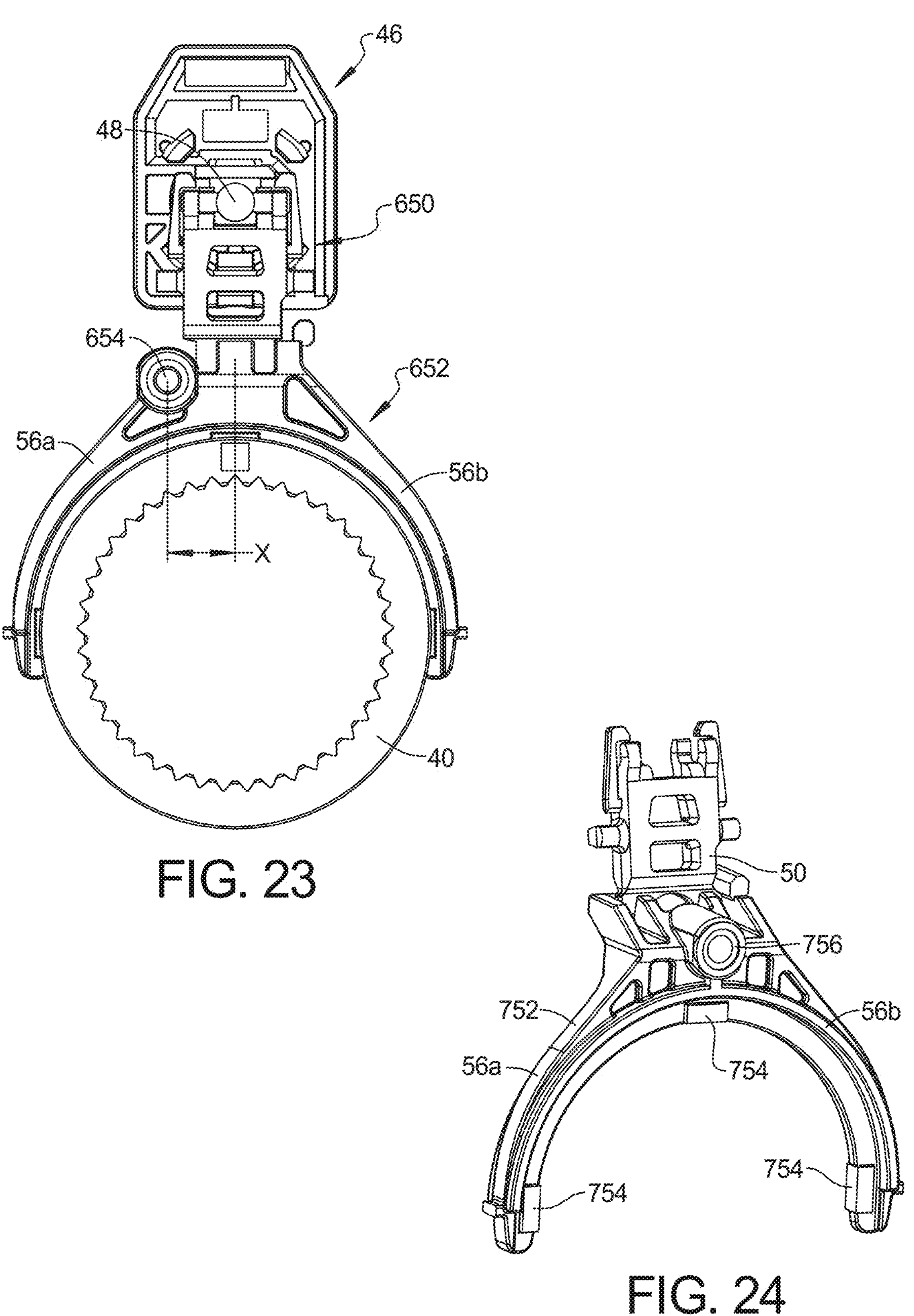
FIG. 23 is a front plan view of an actuator according to a further embodiment of the present disclosure.
FIG. 24 is a perspective view of a shift fork with wear features according to the principles of the present disclosure.

With reference to FIG. 23, an alternative shift fork 652 is slidably supported on an elongated translation pin 654 that is laterally offset from the plunger 48 of the solenoid 46. The offset translation pin 654 allows the rocker 650 to interact with the shift fork 652 at a lower point with respect to the elongated translation pin axis. Preferably, the end of the rocker 650 is aligned with an axis of the translation pin 654 in order to reduce any binding effect. As shown in FIG. 23, the offset translation pin 654 can be offset by a distance X.

Figure 25:
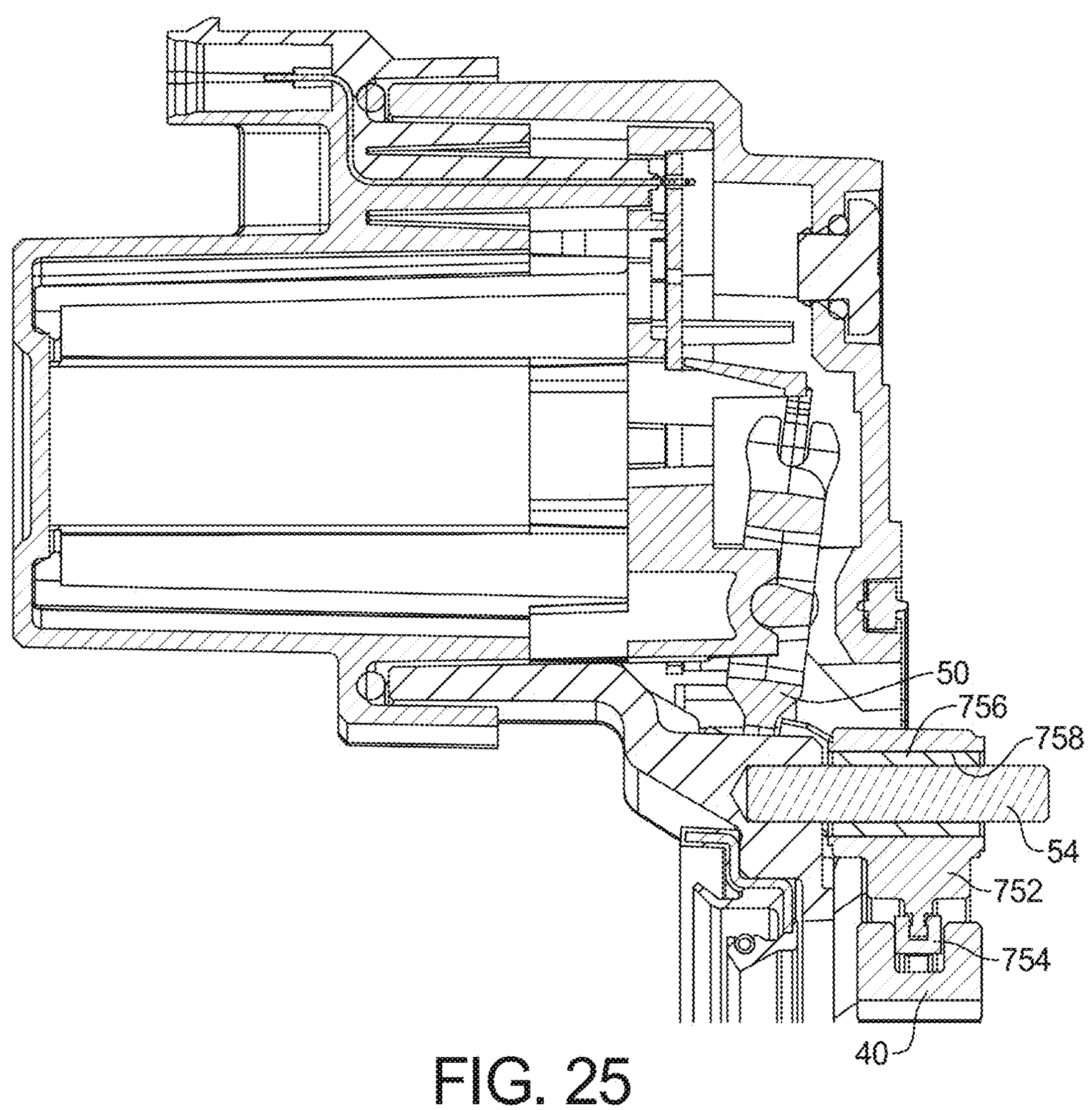
FIG. 25 is a cross-sectional view of the actuator shown with the wear features on the shift fork according to the principles of the present disclosure.

With reference to FIGS. 24 and 25, the shift fork 752 is shown with three clutch ring wear features 754 that are designed to engage the clutch ring 40 as shown in FIG. 25. The three wear features 754 can be spaced from one another to engage within a groove of the clutch ring 40 at spaced circumferential locations. Alternatively, more or fewer wear features 754 can be used up to a single continuous wear contact feature. The wear features 754 can be molded onto the shift fork 752 and can be formed from a synthetic fluoropolymer such as Polytetrafluoroethylene (PTFE), TEFLON (preferably injection molded and glass filled), a synthetic polymer such as nylon (preferably injection molded and glass filled), infused nylon, Polyoxymethylene (POM-H) sold under the name DELRIN, a polyimide based plastic such as VESPEL manufactured by DuPont de Nemours, Inc., Powder Metallurgy (PM) Bronze, Polyamide-imide (PAI), polyimide, or similar material with a low coefficient of friction and high wear tolerance.

As shown in FIG. 25, a slide bearing feature 756 can be molded within the aperture 758 of the shift fork 752 to provide easier translation of the shift fork 752 along the translation pin 54. The slide bearing feature 756 can be formed from a synthetic fluoropolymer such as Polytetrafluoroethylene (PTFE) such as that sold under the tradename PULON by Saint-Gobain Performance Plastics, TEFLON (preferably injection molded and glass filled), a synthetic polymer such as nylon (preferably injection molded and glass filled), infused nylon, Polyoxymethylene (POM-H) sold under the name DELRIN, a polyimide based plastic such as VESPEL manufactured by DuPont de Nemours, Inc., Powder Metallurgy (PM) Bronze, Polyamide-imide (PAI), polyimide, or similar material with a low coefficient of friction and high wear tolerance.

Figures 28, 29:
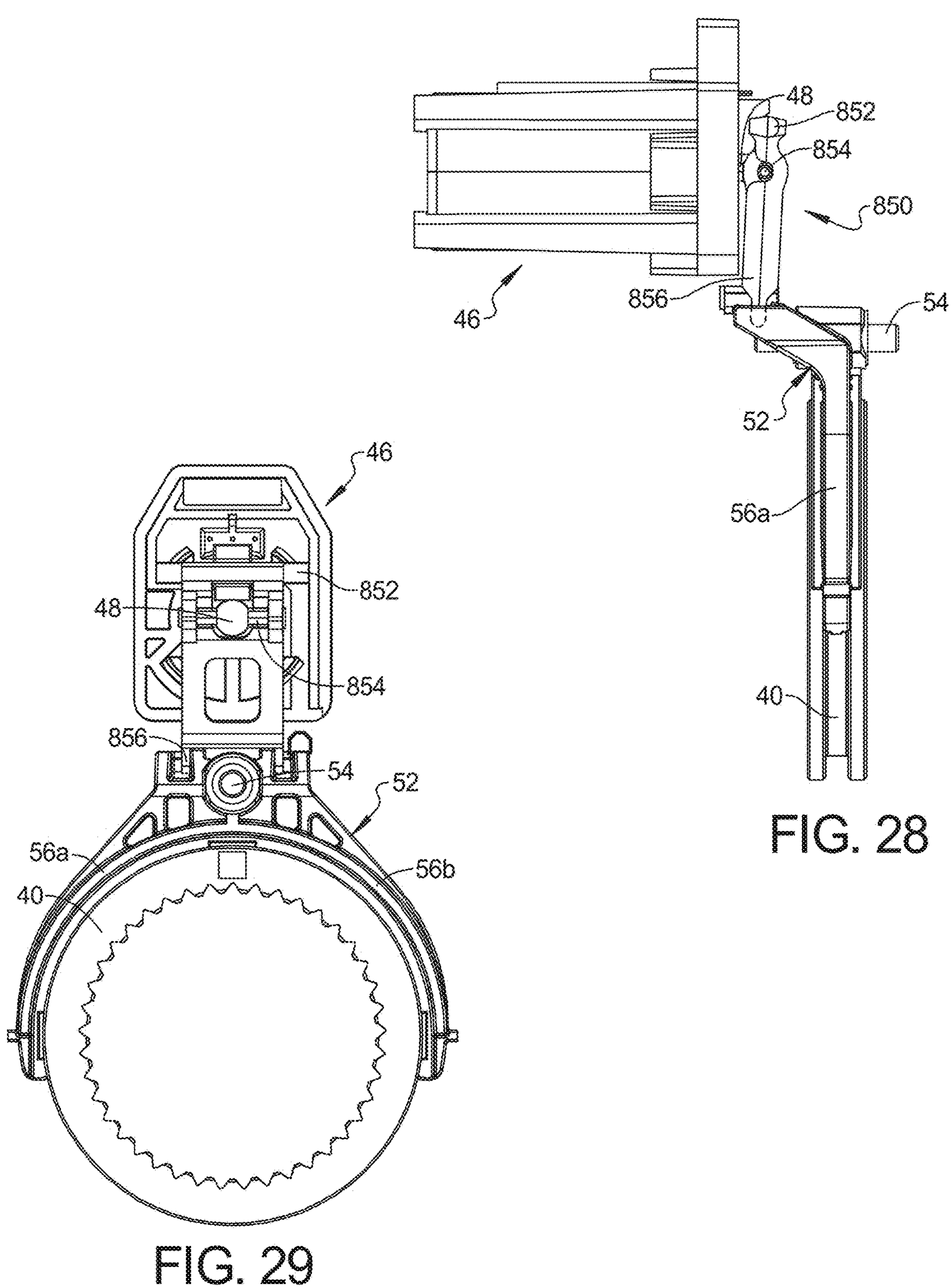
FIG. 28 is a side plan view of the actuator having a rocker configured to have a top pivot mount.
FIG. 29 is a front plan view of the actuator having a rocker configured to have a top pivot mount.

With reference to FIGS. 28 and 29, the rocker 850 is shown including a pivot 852 that is at a first (upper) end of the rocker 850. The rocker 850 is connected to the plunger 48 of the solenoid 46 at an intermediate location by a cross pin 854 and engages with the shift fork 52 at a second (lower) shift fork engagement end 856 of the rocker 850. A length between the pivot 852 and the cross pin 854 and between the cross pin 854 and the second shift fork engagement end 856 can be selected to allow for the proper amount of throw of the shift fork 52 to properly engage and disengage the clutch ring 40.

Figures 30, 31:
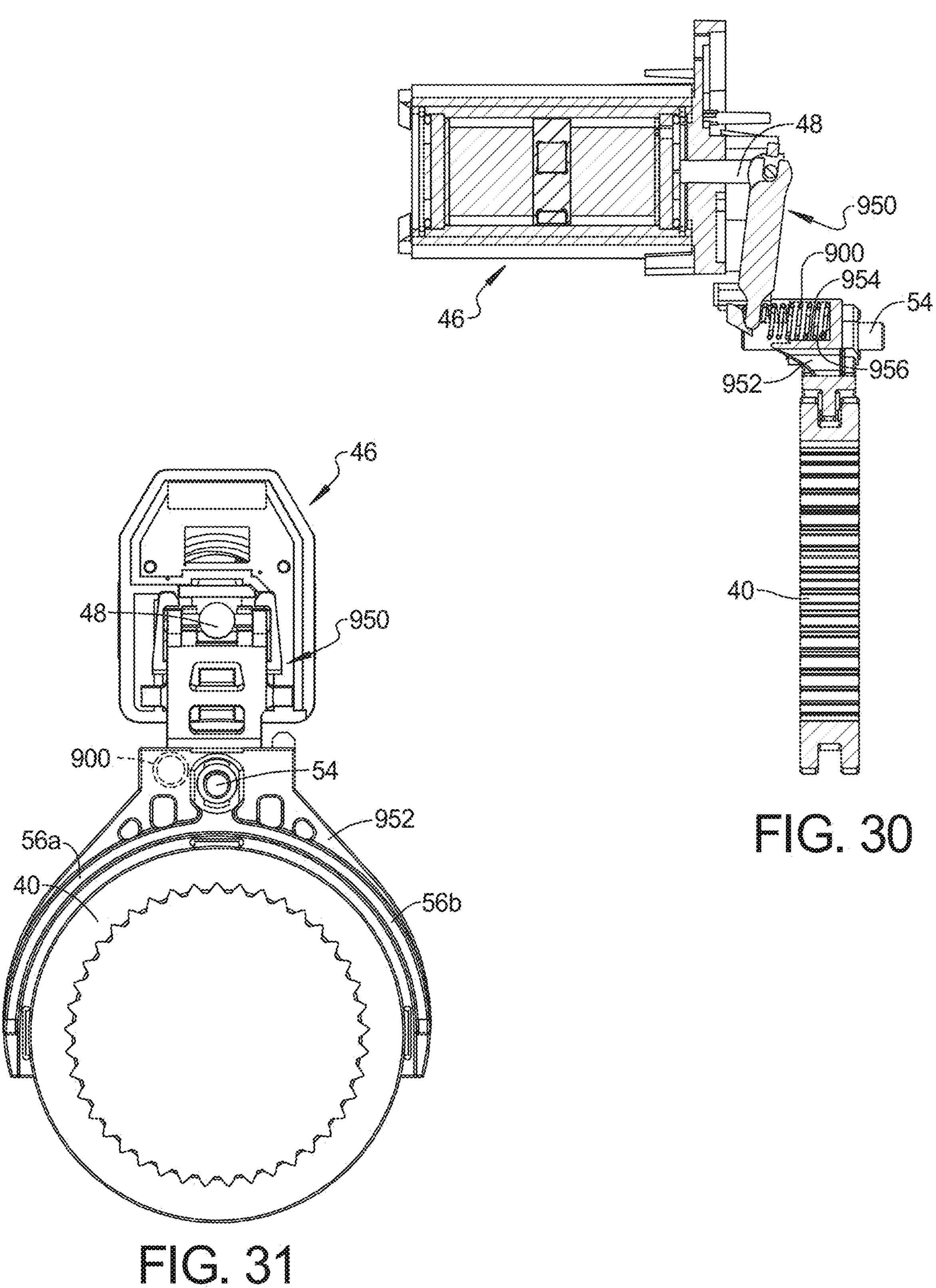
FIG. 30 is a cross-sectional view of the actuator having a lost motion spring between the rocker and the shift fork.
FIG. 31 is a front plan view of the actuator having a lost motion spring between the rocker and the shift fork.
Figures 32, 33:
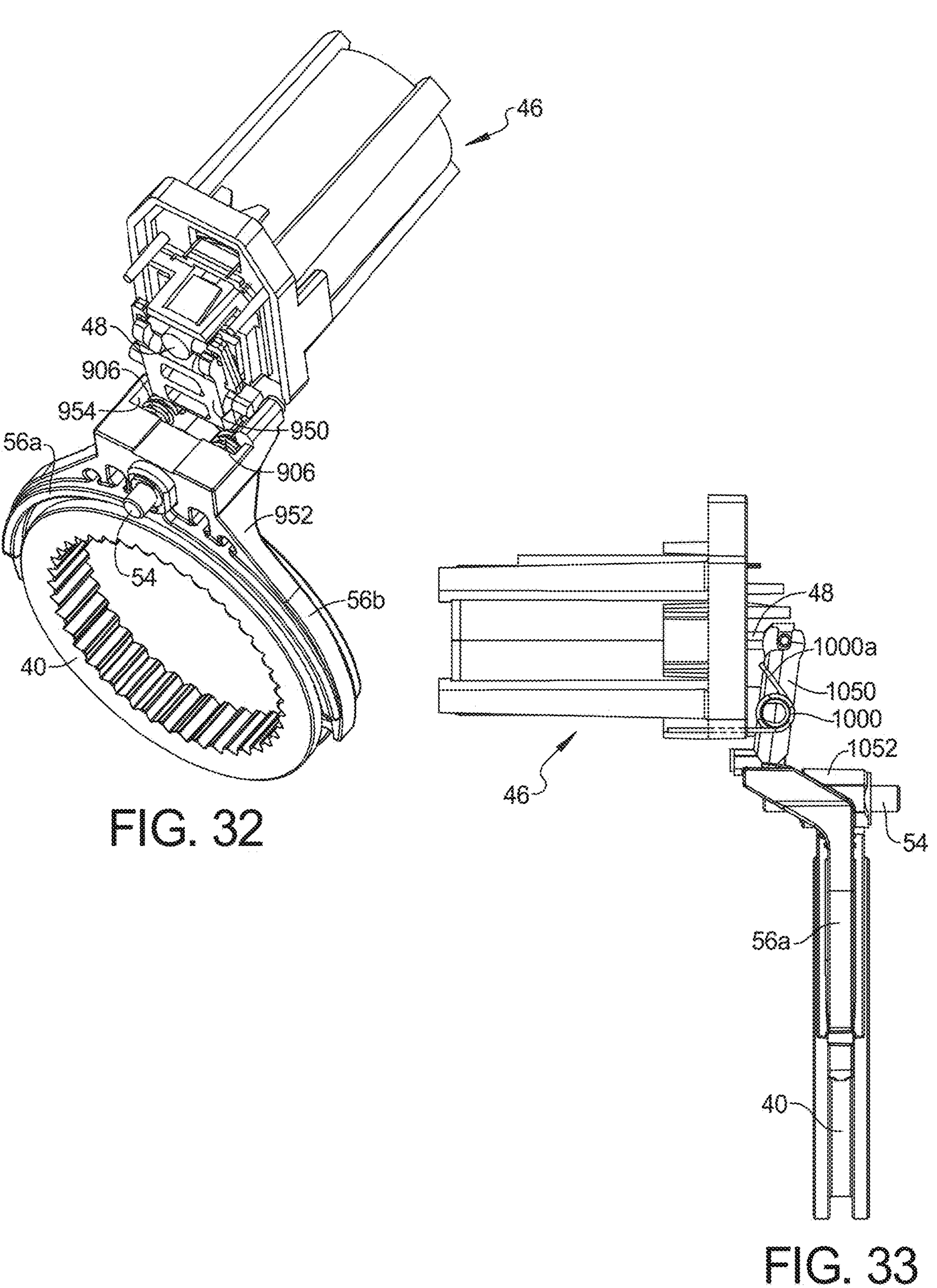
FIG. 32 is a top perspective view of the actuator having a pair of lost motion springs between the rocker and the shift fork.
FIG. 33 is a side plan view of the actuator having a torsion spring acting against the rocker.

With reference to FIGS. 30-32, one or more coil springs 900 are shown between the rocker 950 and the shift fork 952. As the rocker 950 is pivoted to move the shift fork 952 to engage the clutch ring 40, the springs 900 can compress when a shift of the clutch ring 40 is blocked, and when the clutch ring 40 is no longer blocked, the compressed springs 900 cause the clutch ring shift to occur. The shift fork 952 can include pockets 954 for receiving the springs 900 between a wall 956 and the second end of the rocker 950.

Figures 34, 35:
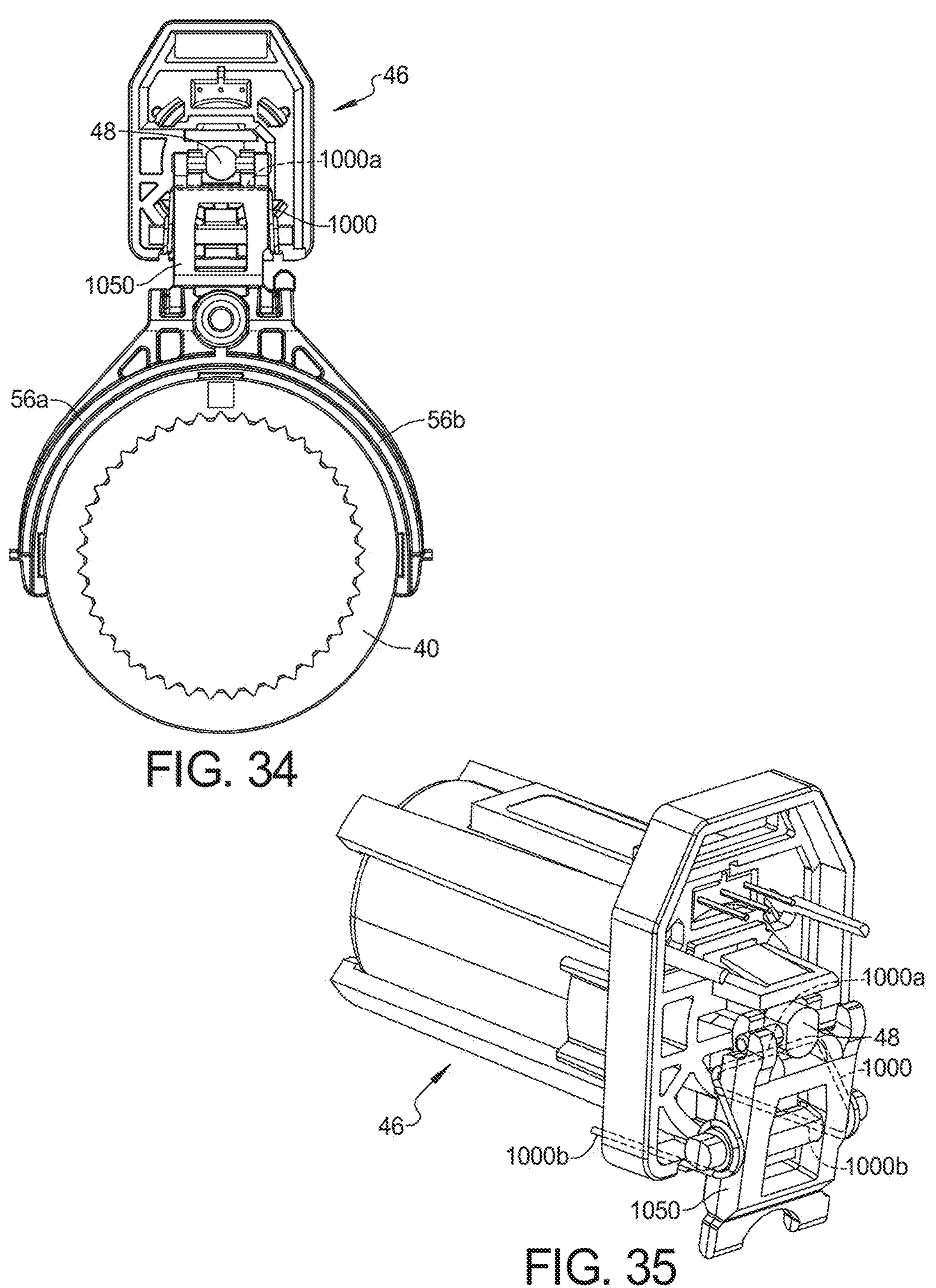
FIG. 34 is a font plan view of the actuator having a torsion spring acting against the rocker.
FIG. 35 is a perspective view of the actuator having a torsion spring acting against the rocker.

With reference to FIGS. 33-35, a return spring 1000 is shown for biasing the rocker 1050 to the disengaged state, as shown. Accordingly, when the solenoid 46 is activated, the plunger 48 moves to a retracted position causing the rocker 1050 to rotate counter-clockwise, as shown to push the shift fork 1052 toward an engaged (4×4) position. The return spring 1000 acts to bias the shift fork 1050 to a disengaged position (4×2) when the energizing of the solenoid 46 is halted. The return spring 1000 can be a torsion spring, coil spring, extension or compression spring as needed for specific applications. The torsion spring 1000, as shown includes a first arm 1000_a_ engaged with the rocker 1050 and a second arm 1000_b_ engaged with the solenoid mount or housing.

Figures 36, 37:
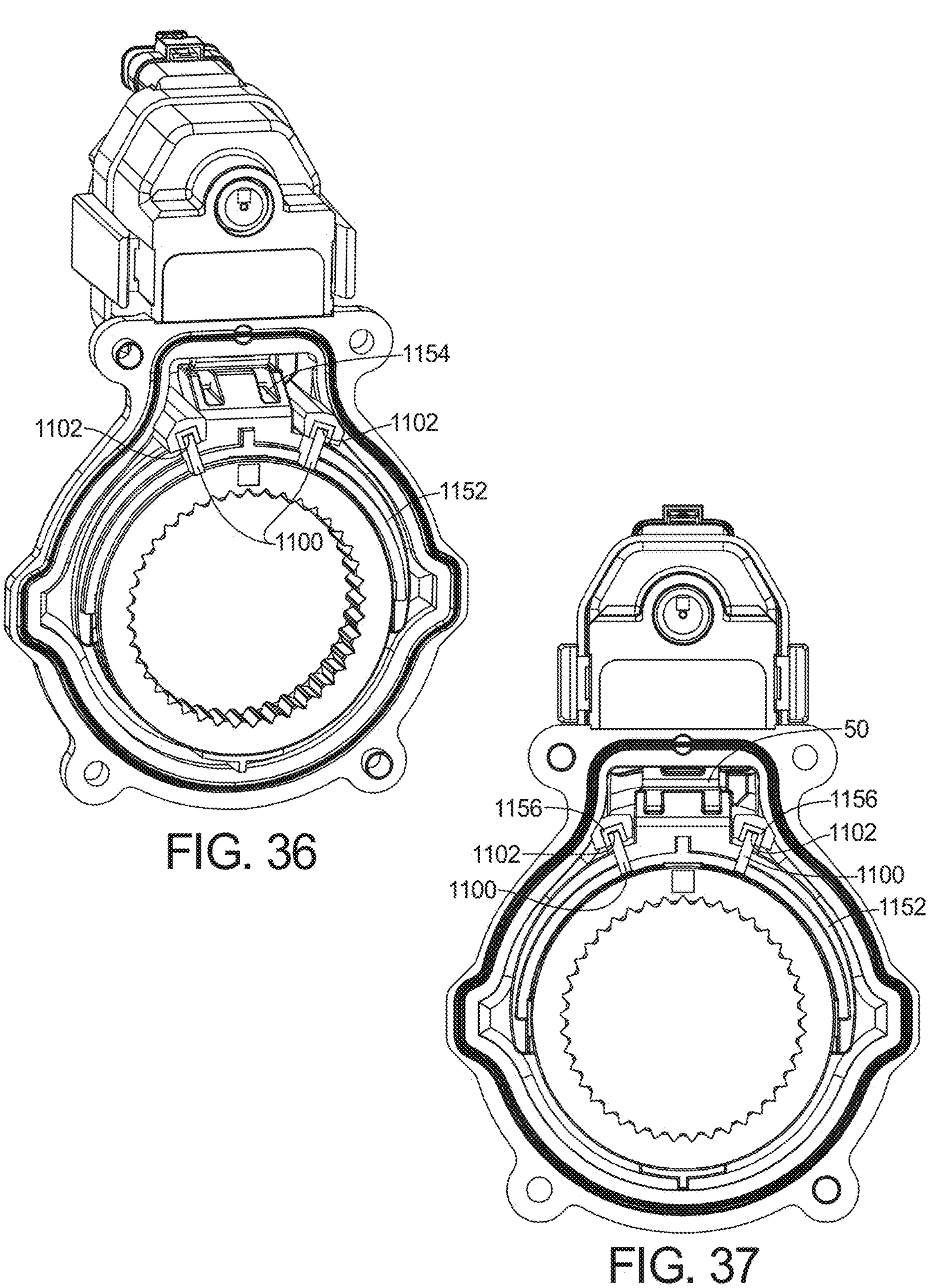
FIG. 36 is a front perspective view of the actuator having rails supporting the shift fork.
FIG. 37 is a front plan view of an actuator having rails supporting the shift fork.

With reference to FIGS. 36 and 37, the shift fork 1152 may use guide rail features 1100 to support the shift fork for translation along the horizontal axis. The guide rail features 1100 are received in guide slots 1102 that control the translation and rotation of the shift fork 1152. The sift fork 1152 includes an engagement slot 1154 for receiving an end of the rocker 50 for moving the shift fork along the guide slots 1102. Translation wear features 1156 can be provided along the slots 1102 or on the shift fork rails 1100 to facilitate easier sliding of the shift fork 1152.

Figures 38, 39:
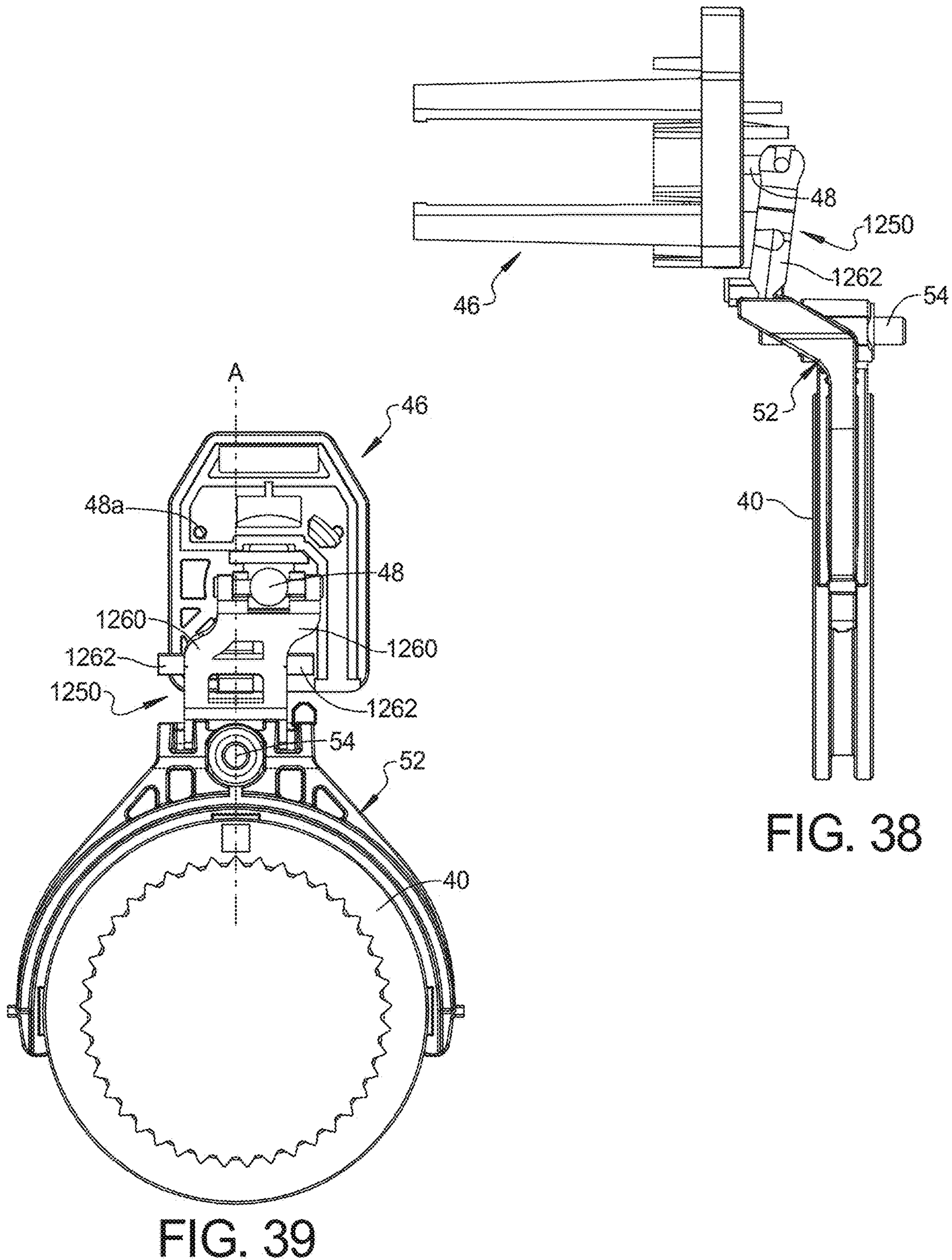
FIG. 38 is a side plan view of the actuator having a laterally offset shift fork according to the principles of the present disclosure.
FIG. 39 is a front plan view of the actuator having a laterally offset shift fork according to the principles of the present disclosure.

With reference to FIGS. 38 and 39, the rocker 1250 is profiled to allow offset of the solenoid 46 along the vertical axis A. In particular, as shown in FIG. 39, the rocker 1240 includes curved regions 1260 above the pivot arms 1262 to allow the solenoid 46 to be laterally offset from the axis of the translation pin 54.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuation system for a wheel end disconnect system, comprising;

- a housing;
- an actuator mounted to the housing, the actuator is actuatable to move a plunger in a fore and aft direction;
- a rocker pivotally mounted to the housing and connected to the plunger; and
- a shift fork slidably mounted for translation along an axis, the shift fork including an engagement feature for receiving a portion of the rocker, wherein activation of the actuator causes pivotal movement of the rocker to cause the shift fork to translate along the axis.

2. The actuation system according to claim 1, wherein the engagement feature is a channel.

3. The actuation system according to claim 1, wherein the shift fork is supported by a translation pin.

4. The actuation system according to claim 3, wherein the translation pin is laterally offset from the plunger.

5. The actuation system according to claim 3, wherein the shift fork includes an aperture with a slide bearing feature received within the aperture and the translation pin received within the slide bearing feature.

6. The actuation system according to claim 2, wherein the channel extends on opposite sides of a translation pin that supports the shift fork.

7. The actuation system according to claim 6, wherein a bottom surface of the channel is aligned with an axis of the translation pin.

8. The actuation system according to claim 3, wherein an end of the rocker includes a cutout to define a pair of legs that straddle the translation pin.

9. The actuation system according to claim 1, wherein the rocker includes a pair of pivot arms for mounting the rocker to the housing.

10. The actuation system according to claim 1, further comprising a magnet mounted to the shift fork and a sensor mounted to the housing for sensing a position of the shift fork relative to the housing.

11. The actuation system according to claim 10, further comprising a control unit for controlling the solenoid and for receiving position signals from the sensor.

12. The actuation system according to claim 11, wherein during a controlled shift of the wheel end disconnect system, the control unit receives signals from the sensor and if the sensor signal indicates that the desired shift is not achieved within a predetermined time period, the shift control is halted.

13. The actuation system according to claim 1, further comprising a clutch ring engaged by the shift fork.

14. The actuation system according to claim 1, wherein the solenoid includes a first coil driver for operating a first coil of the actuator in a first direction and a second coil driver for operating a second coil of the actuator in a second direction.

15. The actuation system according to claim 1, wherein the rocker includes a pivot feature and an upper portion extending in a first direction from the pivot feature and a lower portion extending from the pivot feature in a second direction that is angled relative to the upper portion of the rocker.

16. The actuation system according to claim 1, wherein the rocker includes a pivot feature and an upper portion extending in a first direction from the pivot feature and a lower portion extending from the pivot feature in a second direction, wherein the upper portion has a different moment arm than the lower portion.

17. The actuation system according to claim 1, wherein the rocker includes snap engagement members for engagement with a cross pin of the plunger.

18. The actuation system according to claim 17, wherein the rocker includes a pair of latches for engaging a top end of the cross pin of the plunger.

19. The actuation system according to claim 1, wherein the rocker includes a pair of pivot arms and a center rocker pivot each molded integrally with the rocker.

20. The actuation system according to claim 1, wherein the rocker includes a metal pivot shaft.

21. The actuation system according to claim 1, wherein the shift fork includes a plurality of wear features for engagement with a clutch ring.

22. The actuation system according to claim 1, wherein the rocker includes a pivot at a first end, a shift fork engagement feature at a second end and is connected to the plunger at an intermediate portion.

23. The actuation system according to claim 1, further comprising a spring disposed between the rocker and the shift fork.

24. The actuation system according to claim 1, further comprising a torsion spring for biasing the rocker in a predetermined direction.

25. The actuation system according to claim 1, wherein the shift fork includes guide rail features that are received in guide slots for translation along an axis.

26. The actuation system according to claim 3, wherein the rocker includes a pivot feature and an upper portion extending in a first direction from the pivot feature and a lower portion extending from the pivot feature in a second direction, wherein the upper portion includes curved regions that allow the upper portion to connect to the plunger at a location offset from the translation pin.

* * * * *